United States Patent [19]

Hommes et al.

[11] Patent Number: 4,675,582
[45] Date of Patent: Jun. 23, 1987

[54] SYSTEM USEFUL FOR CONTROLLING MULTIPLE SYNCHRONOUS SECONDARIES OF A LINEAR MOTOR ALONG AN ELONGATED PATH

[75] Inventors: William J. Hommes, Hockessin; John J. Keegan, Jr., Wilmington, both of Del.

[73] Assignee: E. I. Du Pont De Nemours and Company, Wilmington, Del.

[21] Appl. No.: 813,311

[22] Filed: Dec. 24, 1985

[51] Int. Cl.$^4$ .............................................. H02K 41/00
[52] U.S. Cl. ...................................... 318/38; 318/135; 310/12
[58] Field of Search ...................... 310/12–14; 318/34–38, 135

[56] References Cited

U.S. PATENT DOCUMENTS 3,803,466  4/1974  Starkey ............................... 318/135
3,904,941  9/1975  Matsui ................................. 318/135

Primary Examiner—Donovan F. Duggan

[57] ABSTRACT

A system useful for controlling multiple secondaries of a linear disposed motor along an elongated path, with the system having a linear synchronous motor with its elongated primary disposed along the elongated path and at least one secondary responsive to the primary with means disposed thereon for attachment to a body to be propelled along the path, a plurality of linear synchronous motor drivers for providing inputs to designated coil windings of the primary for developing a traveling electromagnetic wave along the primary, a driver controller means connected to each motor driver which has plurality of memory sections for storing therein characteristics of waveforms for use in the system of the invention, a central controller for controlling the output of the plurality of driver controller means and a system computer for down loading instructions for the various waveform patterns to the memories of the driver controller means and for overall supervisory control of the system of the invention.

31 Claims, 16 Drawing Figures

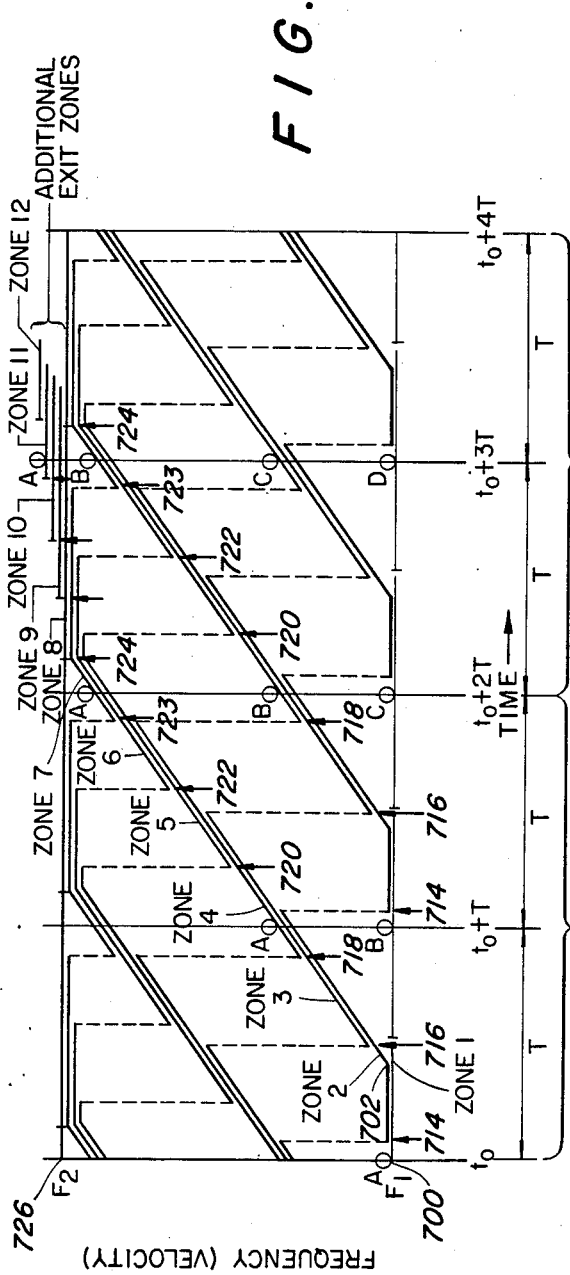

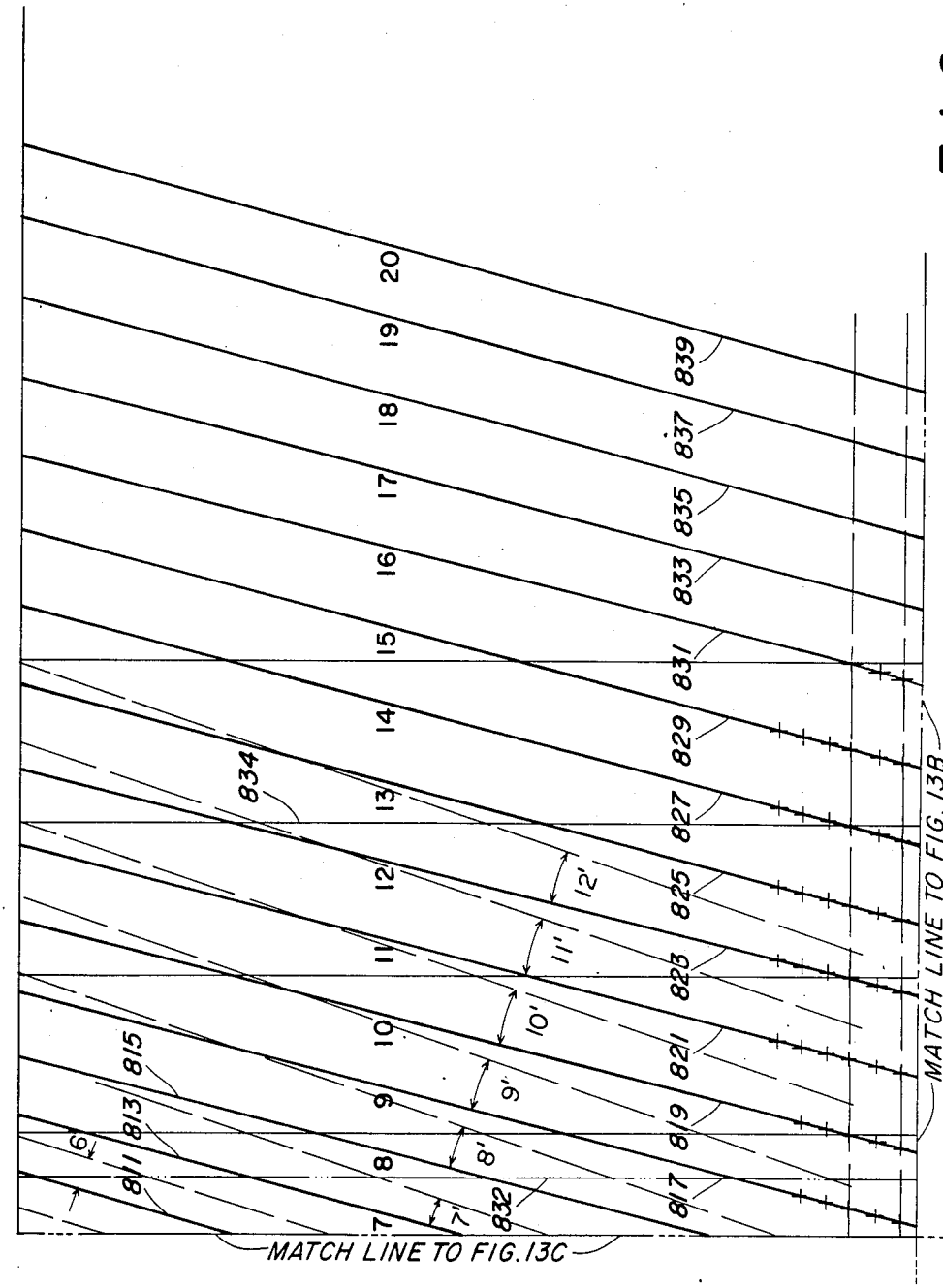

SYSTEM USEFUL FOR CONTROLLING MULTIPLE SYNCHRONOUS SECONDARIES OF A LINEAR MOTOR ALONG AN ELONGATED PATH

TECHNICAL FIELD

The present invention relates to the field of systems useful for controlling the velocity, and spacing of multiple secondaries traveling along the primary of a linear synchronous motor disposed along an elongated path. More specifically, the present invention relates to a system for and method of controlling the velocity and relative spacing of multiple secondaries of a linear synchronous motor which are propelled along an elongated fixed primary in which the primary is divided into a plurality of zones that are independently powered and controlled.

BACKGROUND ART

Linear synchronous motors (hereinafter "LSM") are well known and have been successfully used for moving vehicles along an elongated path. Laithwaite, Proceedings of the IEEE, "Linear-Motion Electrical Machines," Vol. 58, No. 4, April 1970. In order for a LSM to operate properly, the secondaries, which move along the fixed primary, have salient spaced apart magnetic poles whose fields synchronize with, or "lock" onto, the traveling electromagnetic (hereinafter "EM") wave developed in the primary. Therefore, when the field of a secondary is synchronized with the EM wave, such secondary will move along the primary at the velocity of the EM wave.

The EM wave has characteristics of velocity, polarity and pole pitch. The EM wave is developed in the primary by powering spaced coils of the primary by a multiple phase alternating current (hereinafter "AC") or power waveform. The velocity of any specific secondary propelled along the primary by an EM wave developed in the primary is determined by the following expression:

$$U = 2\lambda f$$

where, "$\lambda$", in accordance with electric motor manufacture nomenclature, is the pole pitch between two adjacent poles of the EM wave, and "f" is the frequency of the AC waveform powering the EM wave. In the above expression, $\lambda$ equals the distance per ½ the cycle of the EM wave. So, the EM wave travels one pole pitch for every ½ of an AC cycle of the power waveform. Since the pole pitch is fixed in the winding pattern in the primary, the pole pitch and pole spacing of the secondaries are matched to that of the fixed primary for any given LSM system. Therefore, by varying the frequency of the power waveform, the velocity of the EM wave is varied and, likewise, so is the velocity of the secondaries "locked" onto the EM wave.

Loss of synchronism between a particular secondary and the traveling EM wave is a problem in LSM systems. This loss of synchronism prevents accurate speed and position control of the secondary, and in the extreme case can cause the secondary to stop. Loss of synchronism can occur because of excessive loading on the secondary due to external loads and forces developed in accelerating (either positively or negatively) the secondary with the EM wave. Loss of synchronism can also occur when independently controlled adjacent zones along the primary are not properly coordinated so that the EM waveform developed in each zone is matched at the interface between such adjacent zones.

The effect of loss of synchronism varies with the type of LSM system. In an LSM system in which the vehicle attached to a secondary has a high mass and is traveling at high speed, the inertia is large compared to the propulsion force. Loss of synchronism in this type of system is not severe and can be corrected during operation by, for example, feedback circuitry. This type of LSM system is more forgiving in that if loss of synchronism occurs, the secondary will continue along the path because of the large amount of inertia associated with it and there is ample amount of time for the EM wave to be adjusted by the feedback circuitry to match the new velocity of the secondary and after such adjustment the secondary will again "lock" onto the EM wave. However, accurate knowledge of the position of the secondary propelled by the EM wave may be lost.

In LSM systems in which the vehicle attached to the secondary has a low mass and travels at a low speed, the inertia is low compared to the propulsion force. In such systems, loss of synchronism can be severe and cause the vehicle attached to the secondary to oscillate or come to a stop. This type of system is unforgiving and adjustment of the EM wave through feedback circuitry would not normally be successful because the feedback adjustment procedure would not have sufficient time to adjust the EM wave before the secondary will have come to a stop.

These two systems are at the extremes of the effect on LSM systems of the loss of synchronism between a secondary and the EM wave. All other systems, such as high inertia-high force or low inertia-low force systems, when experiencing loss of synchronism, will react somewhere in between the two. So, it is very critical in all LSM systems, which are very unforgiving, to ensure that loss of synchronism does not occur because it may result in total shut down of the system.

In a LSM system which has multiple zones in which each specific zone is independently powered to develop an EM wave, there is a problem in maintaining precise control in powering the primary to match the power waveform and, therefore, the EM wave at the interface between adjacent zones. As a secondary crosses the interface, or is "handed off", between two independently controlled zones, the EM wave developed for each zone for a period of time propels this same secondary. The magnetic pole velocity and polarity of the traveling EM wave developed independently in the adjacent zones must match each other during "hand-off" or synchronism between the EM wave and the secondary will be lost. The mismatch will exist if either the frequency or phase of the two power waveforms, which develop the EM wave independently in each adjacent zone, are not the same at their interface.

In situations when the independently controlled adjacent zones propel the secondary at a constant velocity or increase or decrease the velocity of the secondary, matching of the power waveforms of adjacent zones during hand off at the interface is a problem.

A prior art method used for effecting the "hand-off" of a secondary from one zone to another, is described in U.S. Pat. No. 3,803,466 (hereinafter "the '466 patent"). In the system of the '466 patent, transition from one zone to another in which acceleration of the secondary is contemplated, is achieved in the following manner. As rotors (secondaries) approach the end of, for example, a constant speed zone, the frequency and phase of the power waveform produced in the stator (primary) in the subsequent, adjacent acceleration zone is adjusted to match that of the constant speed zone via feedback circuitry. As the rotors transition from the constant speed zone to the acceleration zone, the powering waveform has the same phase and constant frequency in both zones. Once the rotor has completely moved into the acceleration zone, a switch is tripped by the rotor that causes the frequency of the power waveform in the acceleration zone to increase. To transition to the next constant speed zone having a higher velocity, or to a second acceleration zone, it is necessary to achieve a constant frequency and phase match at "hand-off" between the two adjacent zones, as previously described. This type of system requires time to achieve synchronism, and substantial amounts of feedback circuitry and sensing to ensure the frequency and phase are properly matched when the rotor is "handed-off" from the constant speed zone to the acceleration zone, or from the acceleration zone to a constant high speed zone, or from one acceleration zone to another.

The present invention provides a system and method that overcomes the limitations and disadvantages of prior art systems as will be described.

SUMMARY OF THE INVENTION

It is found that the aforementioned problems can be substantially overcome by the present invention, which is particularly pointed out in the appended claims and illustrated in the preferred embodiments in the accompanying drawings.

BRIEF DESCRIPTION OF THE DRAWINGS

FIG. 6 shows a logic truth table for the RAM select logic of the zone controller shown in FIG. 5.

FIG. 7 shows the logic truth table of outputs from the central controller to the RAM select logic versus the logic states of the RAM select logic of the zone controller of FIG. 5.

FIG. 12 shows a graphical representation of a composite frequency slope up for acceleration of secondaries from a first constant velocity to a second constant velocity.

DETAILED DESCRIPTION OF THE DRAWINGS

Figure 1:
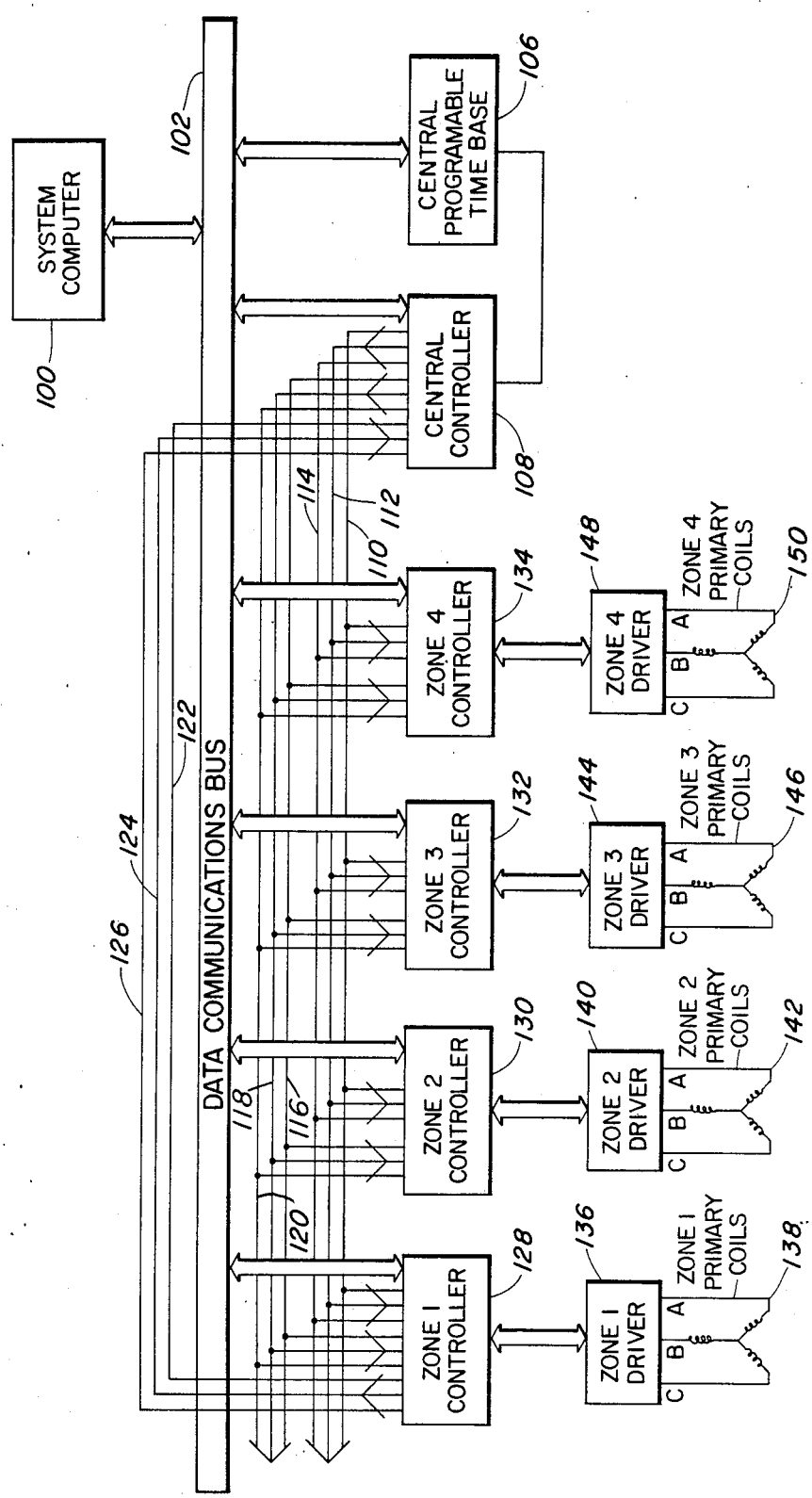
FIG. 1 shows a block diagram of a representative portion of the system of the invention.

FIG. 1 shows a block diagram of a representative portion of the system of the invention. The system of the present invention has a variety of uses. In addition to the uses of an LSM mentioned in the Laithwaite article and the '466 patent, the apparatus and method of the present invention may be useful in a variety of other applications, such as, but not limited to: (1) propelling individual, linear motor powered, railway vehicles (U.S. Pat. Nos. 3,158,765; 4,061,089; and 4,454,457); (2) propelling separate gripper carriages in parallel tracks (U.S. Pat. No. 4,081,723); (3) individually accelerated or decelerated material handling conveyors or the like (U.S. Pat. Nos. 2,831,131; 4,530,428; and 4,533,073); (4) stretching wool fleece and other similar materials (U.S. Pat. No. 4,406,038); and (5) biaxially drawing plastic films (U.S. Pat. No. 3,890,421; Japanese patent publication 48-38779).

The system as shown in FIG. 1 has system computer 100, central programmable time base 106, central controller 108, and a plurality of independent zone drive means. In the portion of the system shown, the independent zone drive means for powering the primary coil windings represented by coil windings 138, 142, 146 and 150, are zone drivers, such as drivers 136, 140, 144 and 148, and zone controllers, such as zone controllers 128, 130, 132 and 134, each of which is connected to the respective zone driver associated therewith. In the system, central controller 108 is connected to each of the zone controllers; central programmable time base 106 is connected to central controller 108 and provides timing signals to the zone controllers through central controller 108; and system computer 100 is connected to central programmable time base 106, central controller 108 and zone controllers 128, 130, 132 and 134 via data communication bus 102. A system so configured is meant to operate in a plurality of steady states and a transition state for transitioning between steady states.

It is also contemplated that the system of the invention can be operated in a single steady state. When the system is so configured, the system includes all of the elements of the system described above except for system computer 100 and central controller 108. Central programmable time base 106 is connected to each of the zone controllers and provides timing signals to the zone controllers for controlling their respective outputs. The zone controllers in this embodiment have only one memory which contains the instructions for one steady state.

System computer 100 is a commercially available computer, such as HP 1000/A900 available from Hewlett-Packard Company, Palo Alto, Calif. System computer 100 provides overall supervisory control of the system of the invention. Computer 100 is connected to data communication bus 102 and provides, among other things, control information for initiating changes in the steady-state operation of the system. Computer 100 also down loads information to the three memories of all zone controllers for storage therein. This information is for development of three distinct power waveform patterns as will be described subsequently.

Central controller 108 is a logic circuit used for controlling the state in which the system operates. The states of operation of the system of the invention are a first steady-state, a second steady-state, and a transition state for transitioning from the first to the second steady-state. The output signals from the central controller 108 determine which memory of the zone controller is selected to develop the power waveform for powering the primary coil winding of a specific zone. It also provides the time base signals from central programmable time base 106 for causing accessing of a selected memory for output of the binary instructions contained therein from the zone controller to the zone driver. Central controller 108 is in two-way communication with data communication bus 102 for both sending and receiving information from computer 100.

Central programmable time base 106 provides a constant frequency pulse waveform to central controller 108 which in turn provides this time base or a sub-multiple signal to each zone controller. The signal provided by time base 106 is a common time base signal used to pace the output of the zone controllers. Central programmable time base 106 can have its output pulse rate changed to different desired values by commands received from system computer 100, as a result of operator input. This permits the speed of the secondaries to be scaled up or down without changing the velocity ratio and relative spacing between secondaries. Central programmable time base 106 is a commercially available apparatus, such as HP 3326A, Programmable Function Generator available from Hewlett-Packard Company, Palo Alto, Calif.

Zone controllers 128, 130, 132 and 134 are representative of all zone controllers of the system of the invention. As will be discussed in greater detail in discussing FIG. 5, these controllers are used for storing the binary instructions of the characteristics of the power waveforms for developing the EM wave for a specific zone of the primary to which it is attached through a particular zone driver.

Zone drivers 136, 140, 144 and 148 operate in conjunction with the above discussed zone controllers to which each driver is attached. As will be described in greater detail in discussing FIG. 9, each zone driver receives a three phase AC input from an external source which is then rectified and filtered to produce a source of DC power. The DC power is applied across pairs of power transistor switches which are switched to produce a frequency and phase adjustable AC output in the primary. Taking for example zone driver 136, it receives digital input signals from attached zone controller 128. The digital input signals are input to a gating logic circuit of zone driver 136 whose output causes switching of the power transistor switch pairs to produce, for example, a six step type output for powering the windings of the primary for developing a traveling EM wave. Zone drivers, such as zone driver 136, are commercially available, such as Model No. 1340-FAA from Allen-Bradley Co., Milwaukee, Wisc. These commercially available drivers are modified with the above mentioned gating logic circuit for switching of the power transistor switches and a voltage control circuit, as will be described subsequently.

Coil winding 138, 142, 146 and 150 of the primary represent the specific coil windings of zones which are powered by a particular zone drive means comprising a zone controller and zone driver. These coil windings are powered in such a manner that a traveling magnetic wave is produced in that zone. This will be described in more detail with reference to FIGS. 2 and 3.

Figure 2:
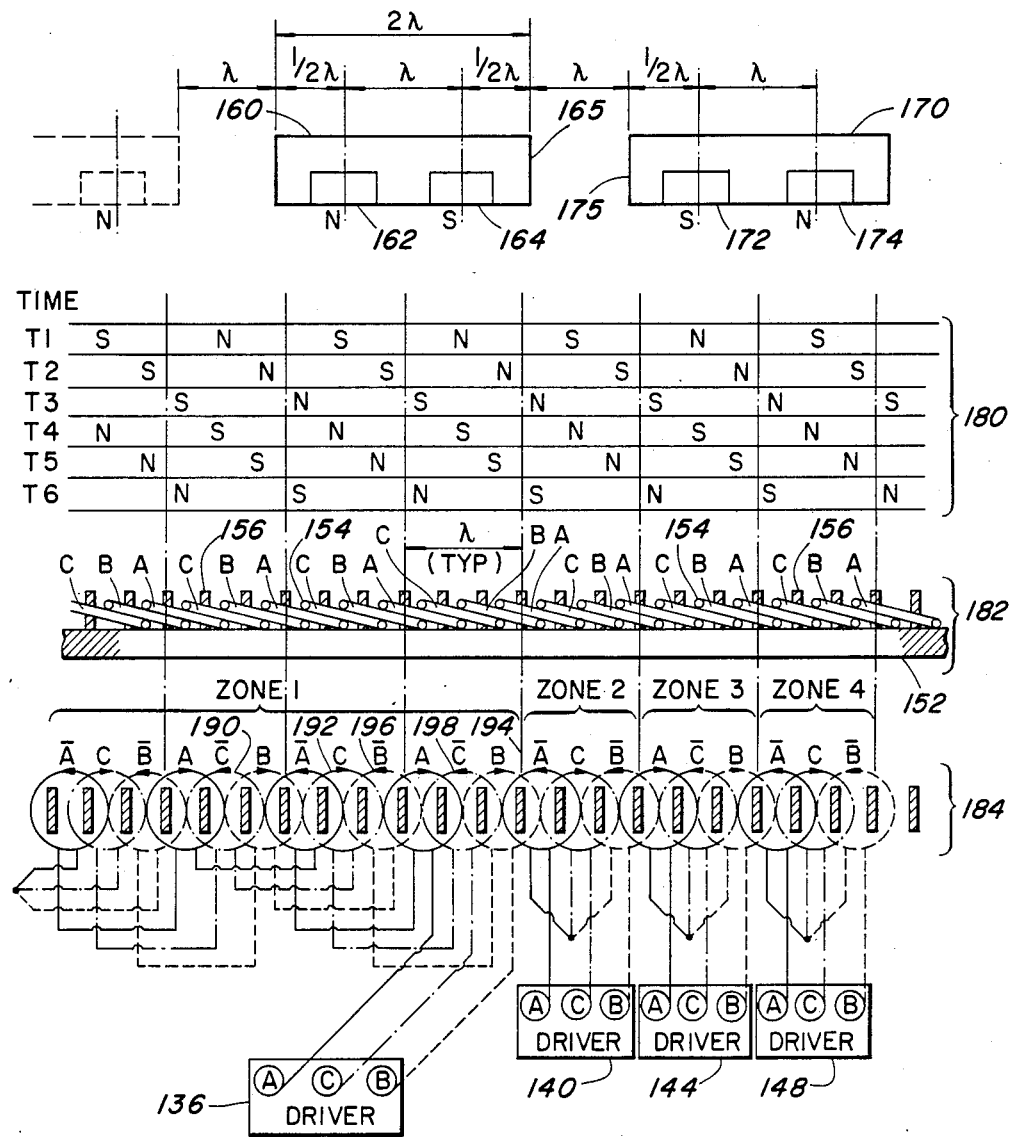
FIG. 2 shows a representative view of the primary and two secondaries of the LSM used in the system of the invention together with four representative zone drivers, and the primary output polarities developed in the primary for propelling the secondaries through the four zones.

Referring to FIG. 2, primary 152 and secondaries 160 and 170, are typical of a short secondary type LSM. Primary 152, shown at 182, is a cross-sectional view of a portion of an elongated primary. At 184, four independently powered discrete contiguous zones are shown. Zone 1 is a constant velocity zone while Zones 2, 3 and 4 are acceleration zones in the acceleration section of primary 152. Primary 152 has slots 154 for disposing therein $\phi A$, $\phi B$ and $\phi C$ coil windings. Disposed between adjacent slots 154 are motor lamination teeth 156 for completion of the magnetic flux path for developing the traveling EM wave. The flux path is created in a conventional manner typical of LSMs, and would be understood by one skilled in the art, and, therefore, does not need further explanation. In the representative example, the coil windings of the primary are $\frac{2}{3}$ chorded.

In the example shown in FIG. 2, the frequency of the three-phase power waveform developed in the primary is constant in constant velocity Zone 1, as well as in acceleration Zones 2, 3 and 4. However, it is understood that the three-phase power waveform used to power the primary coil windings of an acceleration zone can have a frequency that varies with time to achieve frequency sloping of the power waveform to increase or decrease the velocity of a secondary being propelled in such an acceleration zone "locked" onto the traveling EM wave developed in the primary by the power waveform.

One of the novel features of the system of the invention is that each zone, such as Zones 1, 2, 3 and 4, is independently controlled by a zone drive means comprising a zone driver and a zone controller (not shown in FIG. 2). Each zone driver is coordinated with the independently controlled zone drivers of adjacent zones so the secondary experiences a continuous traveling EM wave along the entire length of elongated primary 152. The velocity and polarity of the traveling EM wave is momentarily matched at the interface between two independently powered zones during "hand-off" by matching the frequency and phase of their power waveforms. This is done without the need of feedback circuitry as disclosed in the prior art.

Referring to FIG. 2 at 180, a position versus polarity graph is shown for six different times associated with the developed EM wave. Shown at 182, as previously stated, is a cross-sectional view of the coils and teeth of the primary. At 184, a top view of the teeth and coils shown at 182 is shown with the direction of positive current flow in the coils indicated. The coils which are disposed in slots 154 are shown, for example, as A and $\bar{A}$. The bar designation over a specific letter merely indicates the direction of positive current flow in that coil is reversed from that in a coil not having the bar designation over it.

Secondaries, such as secondaries 160 and 170, are propelled along primary 152 by the traveling EM wave developed by the coil windings. These secondaries are preferably mounted on a monorail for movement along the primary. There is a conventional air gap between the primary and secondaries when the secondaries are mounted on the monorail. Secondary 160 has conventional permanent magnets 162 and 164 disposed in the bottom surface. These magnets provide opposing polarities at the bottom surface of the secondary adjacent to, but spaced away from, primary 152. Magnetic poles 162 and 164 are separated by a distance of one pole pitch or "λ", thereby, matching the fixed pole pitch of the primary. Adjacent secondaries, such as secondary 160 and 170, have the disposition of their magnets reversed. For example, secondary 160 has magnet 162 which is a North pole followed by magnet 164 which is a South pole, while adjacent secondary 170 has magnet 172 which is a South pole followed by magnet 174 which is a North pole. Adjacent secondaries have their poles reversed to allow for the closest disposition in a common zone of adjacent secondaries, which is a 1λ separation between the magnetic edges of adjacent secondaries. However, the magnets can be disposed in a repeating pattern in adjacent secondaries, such as North/South - North/South. If the magnets are disposed in this manner, the minimum separation between the magnetic edges of adjacent secondaries must be 2λ.

Figure 3:
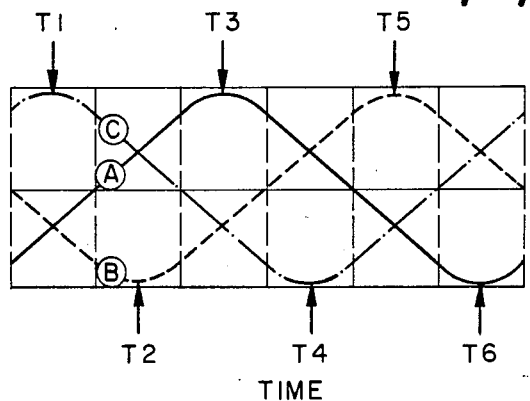
FIG. 3 shows a three-phase AC waveform used for describing the development of the traveling EM wave in the primary of the LSM shown in FIG. 2.

In the development of the traveling EM wave, taking for example the instant of time T1 in FIG. 3, the current flow in the C-phase coils is at the maximum positive value. Therefore, at 184 in Zone 1, the current flow in the C-phase coils 190 and 198 is in the counterclockwise direction, and clockwise in the C-phase coil 192. This will mean that at 182, by the well known "right hand rule", a North pole is produced by coils 190 and 198 and a South pole by coil 192 in Zone 1. As indicated at 180 along line T1, the South pole over C-phase coil 192 of Zone 1 engages the North pole of magnet 162 of secondary 160, and the North pole over C-phase coil 198 of Zone 1 engages the South pole of magnet 164.

Zone drivers 136, 140, 144 and 148 for Zones 1, 2, 3 and 4, respectively, all develop power waveforms which match momentarily at the interfaces between zones along the length of primary 152. For example, the last C-phase coil of Zone 1 has its positive direction of current flow in the counterclockwise direction producing a North pole; the C-phase coil of Zone 2 has its positive direction of current flow in the clockwise direction producing a South pole; the C-phase coil of Zone 3 has its positive direction of current flow in the counterclockwise direction producing a North pole; while the C-phase coil of Zone 4 has its positive direction of current flow in the clockwise direction producing a South pole. This disposition of C, C is repeated throughout the length of the primary for the C-phase coils. This is also true for the A-phase and B-phase coils. In this manner, the North and South poles along primary 152 are developed for engaging the magnets and propelling secondaries 160 and 170. Also, since there is a distance of 2λ between the closest pole centerlines of adjacent secondaries, secondary 170 can be accelerated independent of secondary 160. This is because each secondary being accelerated will always be in a different zone at any given instant of time, therefore being subjected to the separate frequency slope of the power waveform of the zone or zones it is being propelled through.

Now taking instant of time T2, the next current peaking coil for developing the traveling EM wave for propelling the secondaries is the B-phase coil. As seen in FIG. 3, at time T2, the current flow in the B-phase coil is at a maximum negative value. As such, the current will flow in a direction opposite that indicated by arrow of coil 196. Noting this, there are alternating polarities for the B-phase coils following line T2 for Zones 1-4 in the same manner as previously described for the C-phase coils. In the shift from time T1 to T2, B-phase coil 196 changes from a North pole to a South pole. This will propel the North pole of magnet 162 of secondary 160 to the right, thereby, advancing the secondary along primary 152 because the magnetic poles of the secondary 160 are "locked" onto the traveling EM wave. By this type of action, secondaries 160 and 170 are propelled to the right along the primary along with the traveling EM wave. Moreover, although a single secondary may be propelled by two zones at the same time, because the smallest zone can be 1λ long while the secondary is 2λ long, there is never a situation in which more than one secondary is in the same acceleration zone at the same time.

Figure 4:
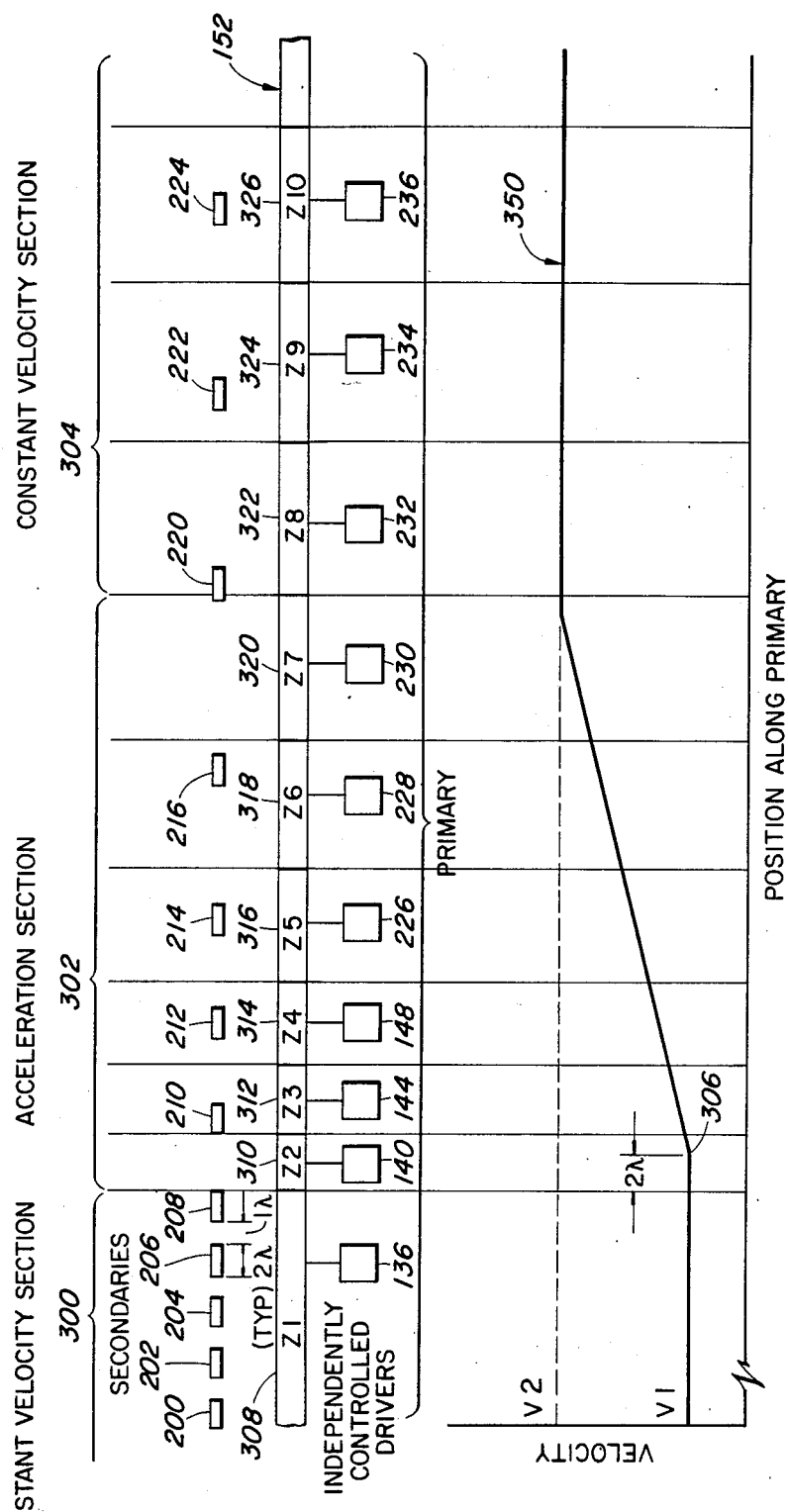
FIG. 4 shows a block diagram of the relationship between the independently powered zones of the primary and the secondaries as the secondaries are propelled through a first constant velocity section, an acceleration section and a second constant velocity section.

Referring to FIG. 4, a block diagram of a portion of the system of the invention displaying the relationship between the primary and secondaries as the secondaries are propelled along the primary from a first constant velocity section to an acceleration section to a second constant velocity section is shown. The secondaries are initially inserted into the system at fixed time intervals at or near the first constant velocity and in synchronism with the EM wave. In FIG. 4, representative secondaries 200, 202, 204, 206, 208, 210, 212, 214, 216, 220, 222 and 224 are shown being propelled along elongated primary 152. Primary 152 is divided into three sections, namely, first constant velocity section 300, acceleration (positive) section 302 and second constant velocity section 304. FIG. 4 represents an instant of time showing the relative position of each secondary with respect to the others presently in the system. First constant velocity section 300 is intended to propel the secondaries at a velocity less than that in second constant velocity section 304. However, it is understood that first constant velocity section 300 could propel the secondaries at a velocity greater than that in second constant velocity section 304, in which case, acceleration section 302 would be a negative acceleration section, and the size of the zones would decrease in length from left to right instead of increase.

Each section is further divided into one or more zones which are each connected to an individual zone drive means (FIG. 1) of which only the zone drivers are shown. First constant velocity section 300 comprises only one zone, Zone 1, 308, to which driver 136 is connected; acceleration section 302 comprises six zones in which driver 140 is connected to Zone 2, 310, driver 144 to Zone 3, 312, driver 148 to Zone 4, 314, driver 226 to Zone 5, 316, driver 228 to Zone 6, 318, and driver 230 to Zone 7, 320; and second constant velocity section 304 comprises three zones in which driver 232 is connected to Zone 8, 332, driver 234 to Zone 9, 324, and driver 236 to Zone 10, 326.

First constant velocity section 300, in which secondaries 200, 202, 204, 206 and 208 are closely spaced, is a single zone, Zone 1, 308. The secondaries proceed from first constant velocity section 300 to positive acceleration section 302. In this section, the velocities of the secondaries, such as secondaries 210, 212, 214 and 216, are independently increased as they move to the right. The secondaries then proceed from acceleration section 302 to second constant velocity section 304 in which the velocity of the secondaries, such as secondaries 220, 222 and 224, is constant.

Graph 350 is a graph of the velocity of the secondaries vs. position along the primary. In graph 350 at 306, there is a 2λ segment at the beginning of the frequency slope up. This is necessary to insure that a secondary, which is 2λ long, enters the first acceleration zone completely before increasing velocity.

In FIG. 4, the system is operating at steady-state. The secondaries enter the system at first constant velocity section 300 at closely spaced intervals. The interval, as shown in FIG. 4, is a 3λ interval comprised of 2λ long secondaries with a 1λ spacing between magnetic edges of adjacent secondaries. However, the secondaries can enter the system unequally spaced by removal of certain secondaries as long as those that remain are in their same relative position with respect to the EM wave. That is, secondaries 202 and 204 can be removed for unequal spacing but secondary 200 must bear its same positional relationship with the developed EM wave.

Acceleration section 302 has zones of increasing length, which is most notable by comparing the length of Zone 2, 310, with the length of Zone 7, 320. The increased length of the zones in acceleration section 302, facilitates an economical method of accomplishing separation of secondaries by increasing their velocity in separate zones based on only one secondary being in a specific zone at any instant of time and each secondary transiting and leaving at least one zone, except for Zone 1, within a fixed time period. However, it is not necessary that the zones have increasing lengths. Each zone along the entire length of the primary can have the same length, for example, 1λ. If this is the case, it is merely necessary to add additional zone drivers and accompanying zone controllers to accommodate the increased number of zones.

Figure 5:
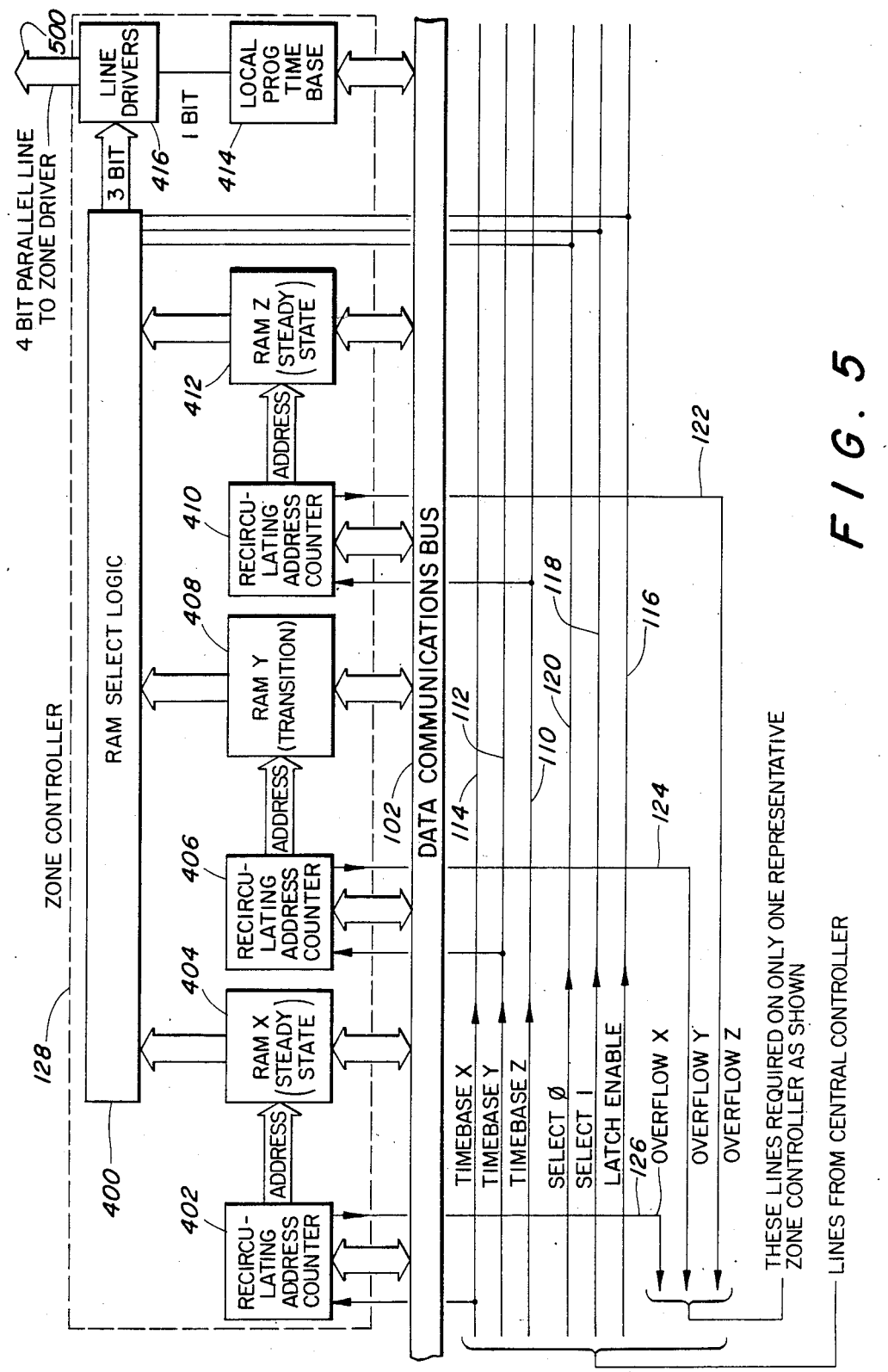
FIG. 5 shows a detailed block diagram of a zone controller shown in FIG. 1.

FIG. 5 is a detailed block diagram of a representative zone controller of a drive means. The zone controller shown in FIG. 5 is referred to by reference numeral 128 indicating the zone controller for Zone 1 in FIG. 1. Zone controller 128 has RAM select logic 400 and three recirculating address counter/random access memory (RAM) pairs, namely, steady-state RAM X pair comprising address counter 402 and RAM 404; transition state RAM Y pair comprising address counter 406 and RAM 408; and steady-state RAM Z pair comprising address counter 410 and RAM 412. Also included in zone controller 128 is line driver 416 and local programmable time base 414. The recirculating address counter/RAM pairs are commercially available from Hewlett-Packard Company, Palo Alto, Calif., such as HP 69791A 64K Word Memory Module. The transition RAM Y pair is the same as the steady-state RAM X and Z pairs except it has additional memory connected thereto. This additional memory is commercially available from Hewlett-Packard Company, Palo Alto, Calif., such as HP 69792A, 192K Word Memory Module.

As discussed previously, a zone controller need only contain one memory when the system is to be operated in one steady state only. In such an embodiment, the zone controller will contain only one recirculating address counter/RAM pair. Since this embodiment is to operate in only one steady state, RAM select logic 400 is also eliminated while the remainder of the zone controller remains substantially as shown in FIG. 5. The memory of each zone controller contains the binary instructions for the frequency and phase characteristics of a separate waveform.

In the preferred embodiment, each of the three RAMs have stored therein binary instructions for the frequency and phase characteristics of a separate waveform. As an example, RAM 404 will have instructions for the phase and frequency characteristics of a steady-state waveform; RAM 408 binary instructions for the phase and frequency characteristics of a transition state waveform; and RAM 412 binary instructions for the characteristics of a second steady-state waveform phase and frequency different from the one stored in RAM 404. The binary instructions stored in each RAM X, RAM Y and RAM Z type memory in all zone controllers have the same fixed quantity of addresses. The binary instructions for these waveforms and their use will be described in more detail subsequently but at this point it is to be understood that the binary instructions for transition state waveform stored in RAM 408 are used for transitioning from binary instructions for the steady-state waveform stored in RAM 404 to the binary instructions for the steady-state waveform stored in RAM 412.

The selected RAM has its contents output from RAM select logic 400 and input to line driver 416. The RAM selected by RAM select logic 400 will be in accordance with signals received from central controller 108 on lines 116, 118, and 120. Generally, the RAM type selected is selected in all zone controllers of the system. As an example, for a first steady-state operating condition, central controller 108 inputs signals to the RAM select logics of all zone controllers to select RAM X, 404. This is necessary because the power waveforms for adjacent zones are matched at the interface when RAMs of a particular type are selected.

In operation, time base pulses, namely, time base X signal 114, timebase Y signal 112 and timebase Z signal 110, from central controller 108 are input to the respective address counters of the recirculating address counter/RAM pairs when that RAM is selected. Taking for example the recirculating address counter/RAM pair, comprising address counter 402 and RAM 404, timebase X signal 114 paces address counter 402. Timebase X signal 114 will cause RAM 404 to provide an output based on this signal. Address counter 402 will sequence through the RAM addresses of RAM 404, and will restart the sequence once RAM 404 has reached the last preprogrammed address.

Central controller 108 controls which signals are output from all RAM select logics, controls the selection of the same RAM type, be it RAM X, RAM Y or RAM Z, for all zone controllers and starts them all in unison. Since, all RAMs X have the same number of instructions and all are paced by a common timebase signal, timebase X signal 114, they all sequence through their addresses, reach the end of their memory addresses and restart at the same time. Because this is the case, central controller 108 need only monitor overflow lines 122, 124, and 126 of one zone controller for overflow of the Z, Y and X address counters, respectively, to determine when the end of the memory of each RAM type is reached if it is desired to select a new RAM type. Selection of a new RAM can only occur after reaching the end of the memory addresses of the RAM currently being accessed. When changing from one RAM to another, there must not be an interruption in the output of instructions to the zone drivers. So, following the last output from the RAM currently being used, the next output will be the first output from the newly selected RAM based on the next time base pulse.

RAM select logic 400 provides a 3 bit output to line driver 416. Line driver 416 receives a fourth bit from local programmable timebase 414. Local timebase 414 is programmed by system computer 100 and provides a 1 bit output signal for controlling voltage set point in the zone driver. The voltage set point value is a function of the average frequency level of the output of that particular zone driver.

FIG. 6 shows the logic truth table for RAM select logic 400. Latch enable signal 116, select-1 signal 118 and select-0 signal 120 from central controller 108 determine which RAM is selected for output by RAM select logic 400. When latch enable signal 116 has a logic "1" value, but both select-1 signal 118 and select-0 signal 120 have logic "0" values, the RAMs are disabled and the output of the RAM select logic 400 is a logic "0" value. When latch enable signal 116 has a logic "1" value and select-1 signal 118 is a logic "0" value but the select-0 signal 120 has a logic "1" value, the steady-state RAM X, RAM 404, is selected by RAM select logic 400 for output to line driver 416. With latch enable signal 116 again having a logic "1" value, the select-1 signal 118 having a logic "1" value and select-0 signal 120 having a logic "0" value, the transition state RAM Y, RAM 408, is selected by RAM select logic 400 for output to line driver 416. When latch enable signal 116 has a logic "1" value while both select-1 signal 118 and select-0 signal 120 have logic "1" values, RAM select logic 400 selects steady-state RAM Z, RAM 412, for output from RAM select logic 400 to line driver 416. When latch enable signal 116 has a logic "0" value, RAM select logic 400 latches the value of its output prior to the logic "0" value. This output would be a 3 bit value from one of the RAMs.

FIG. 7 shows a logic truth table of outputs from central controller 108 with respect to the logic states of RAM select logic 400. When the RAMs are disabled, select-1 signal 118, select-0 signal 120, timebase X signal 114, timebase Y signal 112 and timebase Z signal 110, all have logic "0" values from central controller 108. When RAM X is desired to be selected, select-1 signal 118 has a logic "0" value and select-0 signal 120 has a logic "1" value, timebase X signal 114 is provided from central controller 108 to pace address counter 402, while timebase Y signal 112 and timebase Z signal 110 have logic "0" values. When RAM Y is desired to be selected, select-1 signal 118 has a logic "1" value and select-0 signal 120 has a logic "0" value, timebase Y signal 112 is provided from central controller 108 to pace address counter 406, while timebase X signal 114 and timebase Z signal 110 have logic "0" values. When RAM Z is desired to be selected, select-1 signal 118 and select-0 signal 120 both have logic "1" values, timebase Z signal 110 is provided from central controller 108 to pace address counter 410, while timebase X signal 114 and timebase Y signal 112 have logic "0" values.

Figure 8:
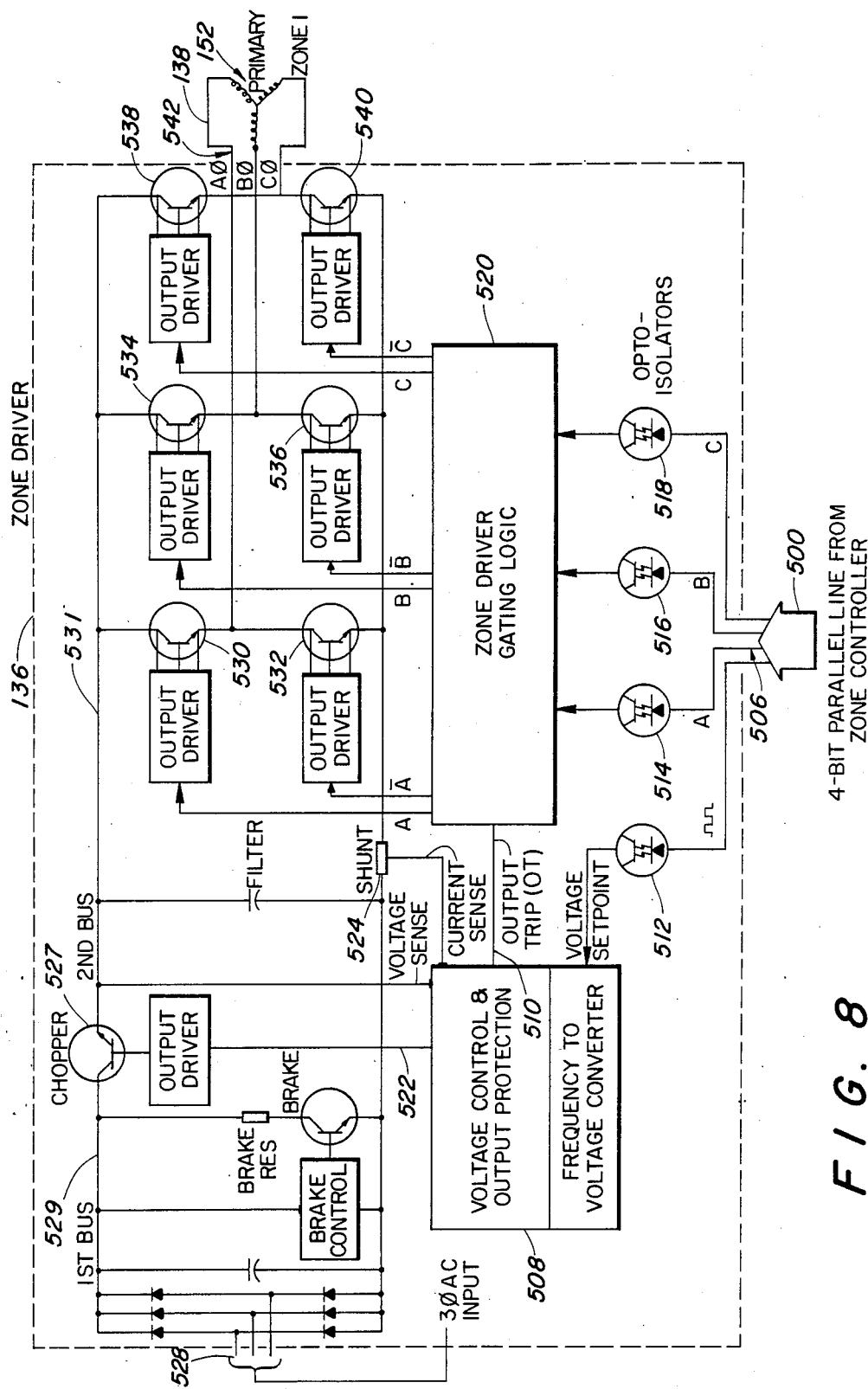
FIG. 8 shows a detailed schematic diagram of a LSM zone driver shown in FIG. 1.

In FIG. 8, a schematic diagram of zone driver 136 is shown. It is to be understood that FIG. 8 is merely representative of all zone drivers of the system of the invention. As previously noted, a zone driver, such as zone driver 136, is commercially available from Allen-Bradley Company, Milwaukee, Wisc., such as Model No. 1340-FAA. These drivers are modified by including gating logic circuit 520 and the frequency to voltage converter portion of circuit 508. Both of the modifications are conventional and would be understood by one skilled in the art without further explanation.

Zone driver 136 has six power transistors switches arranged in pairs, such as 530, 532; 534, 536; and 538, 540. Three-phase AC input 528 to zone driver 136 is rectified, chopped and filtered in a conventional manner to provide a DC voltage to the power side of zone driver 136. The voltage control portion of circuit 508 measures the voltage on second driver bus 531 and switches chopper 527 to bring the second driver bus voltage into agreement with the voltage set point called for by the voltage control system. The output protection portion of circuit 508 is for disabling zone driver 136 should a potentially damaging condition exist. The output protection portion of circuit 508 senses any current faults via shunt 524 and sends the appropriate signal to the gating logic circuit through output trip-off line 510 to open all power transistors as necessary for protection of driver 136.

Zone driver gating logic circuit 520 provides a digital input to the power transistors switches for controlling the output of the zone driver 136 for powering the $\phi$A, $\phi$B and $\phi$C coil windings 138 of primary 152. The 4 bit parallel input 500 from line driver 416 of zone controller 128 (shown in FIG. 5) is input to zone driver 136. Of the 4 bit parallel input, 1 bit is fed to the frequency to voltage converter portion of voltage control and output protection circuit 508 for setting the average voltage level for the driver, and the other 3 bits contain the binary instructions for switching the power transistors switches for controlling the frequency and phase of the power waveform for powering $\phi$A, $\phi$B and $\phi$C coil windings 138.

The A input associated with the $\phi$A coil winding of the primary is input to opto-isolator 514, the B input associated with the $\phi$B coil winding of the primary is input to opto-isolator 516 and the C input associated with the $\phi$C coil winding is input to opto-isolator 518. The three opto-isolators are commercially available, such as Model H11A1 available from Motorola, Inc., Austin, Tex.

Figures 9, 10:
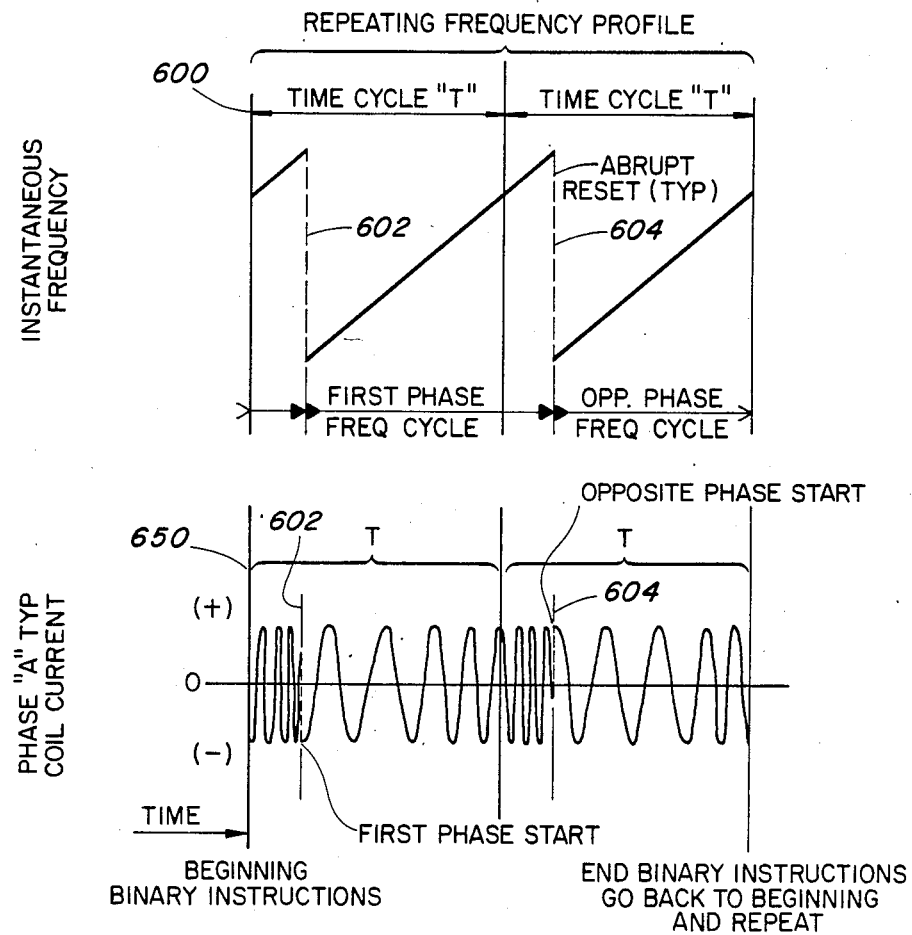
FIG. 9 shows a logic truth table for the inputs and outputs of the driver logic circuit of the LSM zone driver shown in FIG. 8.
FIG. 10 shows a representation of a repeating two cycle frequency profile and the corresponding waveform output from a zone driver after processing the binary instructions from the zone controller shown in FIG. 5.

FIG. 9 shows the truth table for the inputs and outputs of zone driver gating logic circuit 520 shown in FIG. 8. The 3 bits from line 500 cause switching of the power transistor switches to form a six step power waveform output for each phase coil consistent with the phase pattern shown in FIG. 3. However, other power waveforms, such as pulse width modulation can be used which is within the understanding of one skilled in the art.

In operation, the six logic lines output from gating logic circuit 520 are input to the power transistor switch pairs, namely, 530, 532; 534, 536; and 538, 540, to cause them to switch in a predetermined manner to develop a six step three phase power waveform. Therefore, the binary instructions input to zone driver 136 from zone controller 128 cause development of the power waveforms for powering of the $\phi$A, $\phi$B and $\phi$C coil windings to in turn develop the desired traveling EM wave in the primary with the proper frequency and phase.

Referring to FIG. 10, a representative sloping frequency profile developed in an acceleration zone of the primary from binary instructions stored in a steady-state RAM, such as RAM 404, is shown. The profile shown at 600 is indicative of the instantaneous frequency of the power waveform developed in the primary of a specific zone. The waveform shown at 650 is indicative of the frequency and phase of the varying alternating current (or power waveform) that occurs in the primary coils consistent with the sloping frequency profile shown at 600. Each frequency profile contains two cycles, one for each cycle time, "T". The time, "T", represents the time required for successive, adjacent secondaries to move past a fixed reference point along the primary. Each RAM selected will output two complete cycles before repeating.

In representations shown at 600 and 650, during cycle time, "T", at 602 and 604, respectively, the frequency resets. This reset, besides being the start of a new frequency slope, also undergoes a 180° phase shift. This 180° phase shift is necessary because adjacent secondaries have their magnetic poles oppositely disposed.

Figure 11:
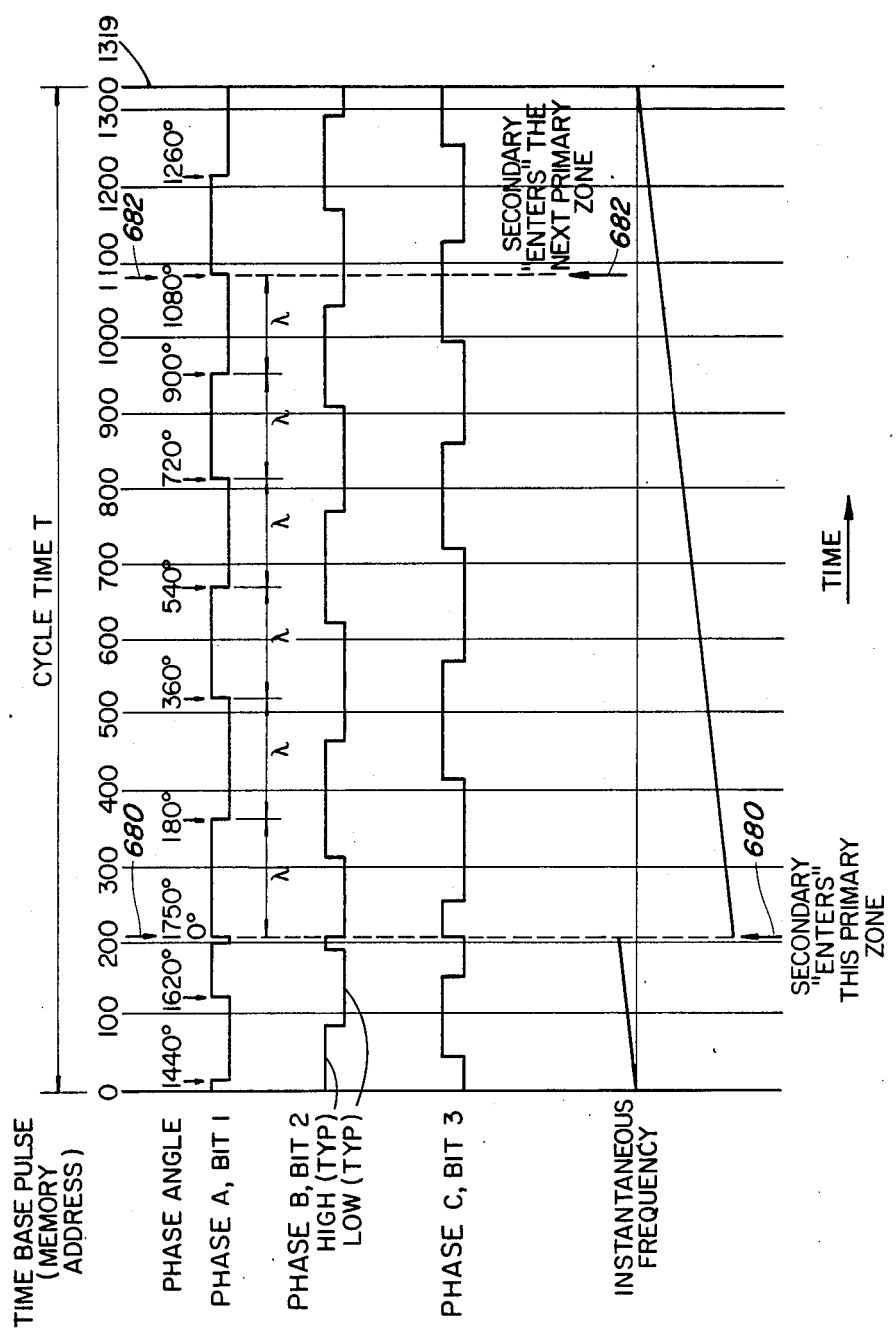
FIG. 11 shows a graphical representation of the binary instruction outputs from a zone controller to a zone driver for one cycle versus phase angle, representative memory address, and frequency slope up of the power waveform developed in the primary.

FIG. 11 shows a graphical representation of the binary instructions for the $\phi A$, $\phi B$ and $\phi C$ outputs from a zone driver vs. the memory address accessed, and phase angle. Also shown in FIG. 11, is the corresponding frequency profile slope up for one time cycle as shown in FIG. 10.

As previously noted, $\frac{1}{2}$ AC cycle causes the EM wave to travel one pole pitch or $1\lambda$. Therefore, the position of a secondary being propelled by such EM wave relative to a primary zone can be traced along the binary instruction waveforms as indicated by the $\lambda$ designations below the $\phi A$ plot. Each of the primary zones are $1\lambda$ or a multiple of $1\lambda$ in length. This will mean that any secondary will always be "handed-off" from one zone to the next at a multiple $\lambda$. However, the zones do not have to be of equal $\lambda$ lengths.

As a secondary begins to enter a zone, at 680, the phase angle is 0°. Also at 680, the frequency slope resets based on the binary instruction at a memory address beyond address 200. The "hand-off" and reset occur simultaneously at this same memory address. From the point of simultaneous "hand-off" and reset, the phase angle and frequency increase with time as shown by the positive slope of the instantaneous frequency curve. This can also be seen by the decreased width of the respective $\phi A$, $\phi B$ and $\phi C$ pulses as they move toward the right. The frequency slope up is continuous until the secondary begins to enter the next zone of primary at 682 at phase angle 1080° and a memory address just prior to address 1100, when the next "hand-off" takes place. The frequency for the zone that the secondary is leaving continues to slope up until the "hand-off" is complete. It is only then that the frequency pattern resets. Also, at reset, the frequency pattern will phase shift 180° to accommodate the next secondary which has its magnets disposed oppositely.

FIG. 12 primarily shows a graphical representation of the composite frequency slopes of the acceleration section of the system of the invention. The frequency profiles which make up the composite frequency slopes are repeating sawtooth profiles for each zone which match and overlap the profiles of the zones adjacent to it. This matching and overlap allows for the smooth "hand-off" of secondaries from one zone to another, as will be described subsequently.

Preferably, in order to properly propel the secondaries, the system of the invention is configured such that any one secondary will pass through one specific acceleration or second constant velocity zone, no matter the length, in a time less than the fixed cycle time, which in FIG. 12 is referred to as cycle time, "T". Cycle time, "T", is a function of the initial minimum secondary spacing and the actual velocity of the secondaries as they enter the system. However, only one secondary will enter a specific zone during each cycle time, "T". Once the system is operating and the first secondary has reached the end of the primary, the system will contain the maximum number of secondaries, so from this point on, for every secondary that enters the system one must leave the system, thereby, keeping the number of secondaries in the system constant.

In FIG. 12, acceleration of secondaries from a first constant velocity, indicated at F1, 700, to a second constant velocity having a higher velocity value, indicated at F2, 726, is shown. The Zone 1 frequency profile is a constant frequency profile operated at frequency F1, and the Zone 8 frequency profile is a constant frequency profile operated at frequency F2. The intermediate zones, Zones 2 to 7, with sloping up frequency profiles are acceleration zones through which the secondaries are accelerated from frequency F1 to frequency F2.

Also as indicated in FIG. 12, the cycle time, T, is the time interval in which adjacent closely spaced secondaries enter the LSM system of the invention.

Secondaries A, B, C and D are individual secondaries that enter the first acceleration zone of the plurality of acceleration zones from the first constant velocity zone every time interval, "T". At time, $t_o$, secondary A is traveling along the primary in Zone 1 at a constant velocity determined by frequency F1. As secondary A moves further to the right in Zone 1, at a time indicated at 714, it is "handed-off" to Zone 2 which has had its frequency and phase reset to match that of Zone 1 at 714. Until the "hand-off" is complete, the frequency in Zone 2 continues to operate at the same frequency and phase of the Zone 1. After the "hand-off" is complete, at 702, the frequency in Zone 2 begins to slope up in accordance with the preprogrammed binary instruction stored in the Zone 2 zone controller, which in the normal case is RAM X, 404. As the frequency slopes up, secondary A is accelerated positively along the primary. Secondary A will continue to accelerate in accordance with the frequency slope of the Zone 2 frequency profile until it reaches point 716 at which point it is "handed-off" to Zone 3. At the point of "hand-off", 716, the Zone 3 waveform and the Zone 2 waveform are momentarily matched in varying frequency and phase as the secondary completely crosses the interface between zones, and a smooth "hand-off" of the secondary is carried out. During "hand-off" between the acceleration zones, the system of the invention matches the continuously varying frequency and phase but does not interrupt the secondary's acceleration with a constant velocity plateau as is found in prior art systems. Following completion of the "hand-off" the Zone 2 frequency profile will reset.

After the "hand-off" takes place at 716, subsequent "hand offs" at 718, 720, 722, 723 and 724 between the remainder of the adjacent acceleration zones, between the last acceleration zone and first zone of the second constant higher velocity section and between successive zones of the second constant higher velocity section are carried out in the same manner described above.

As is shown in FIG. 12, subsequent secondaries B, C and D enter the system at multiples of time, "T", namely at time $t_o+T$, time $t_o+2T$, and time $t_o+3T$, respectively, and are accelerated in the same manner as secondary A. Further, as shown, none of the secondaries are in the same acceleration or second constant higher velocity zone at the same time; therefore, independent acceleration and spacing of the individual secondaries is carried out.

Figure 13A:
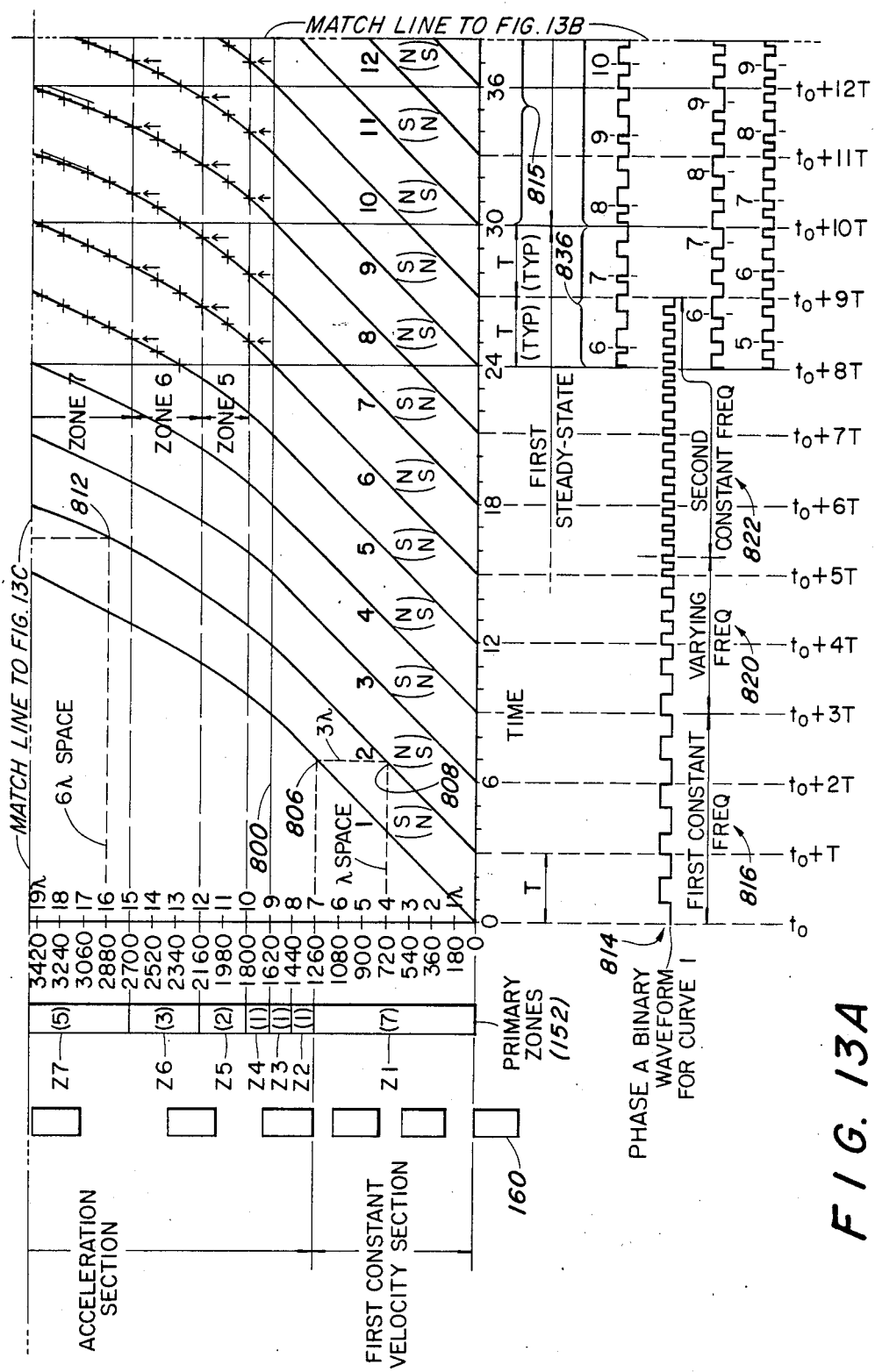
FIG. 13—D show a graphical representation of the position of secondaries along the primary in phase angle versus time for two representative steady-state conditions and a representative transition state condition.
Figure 13B:
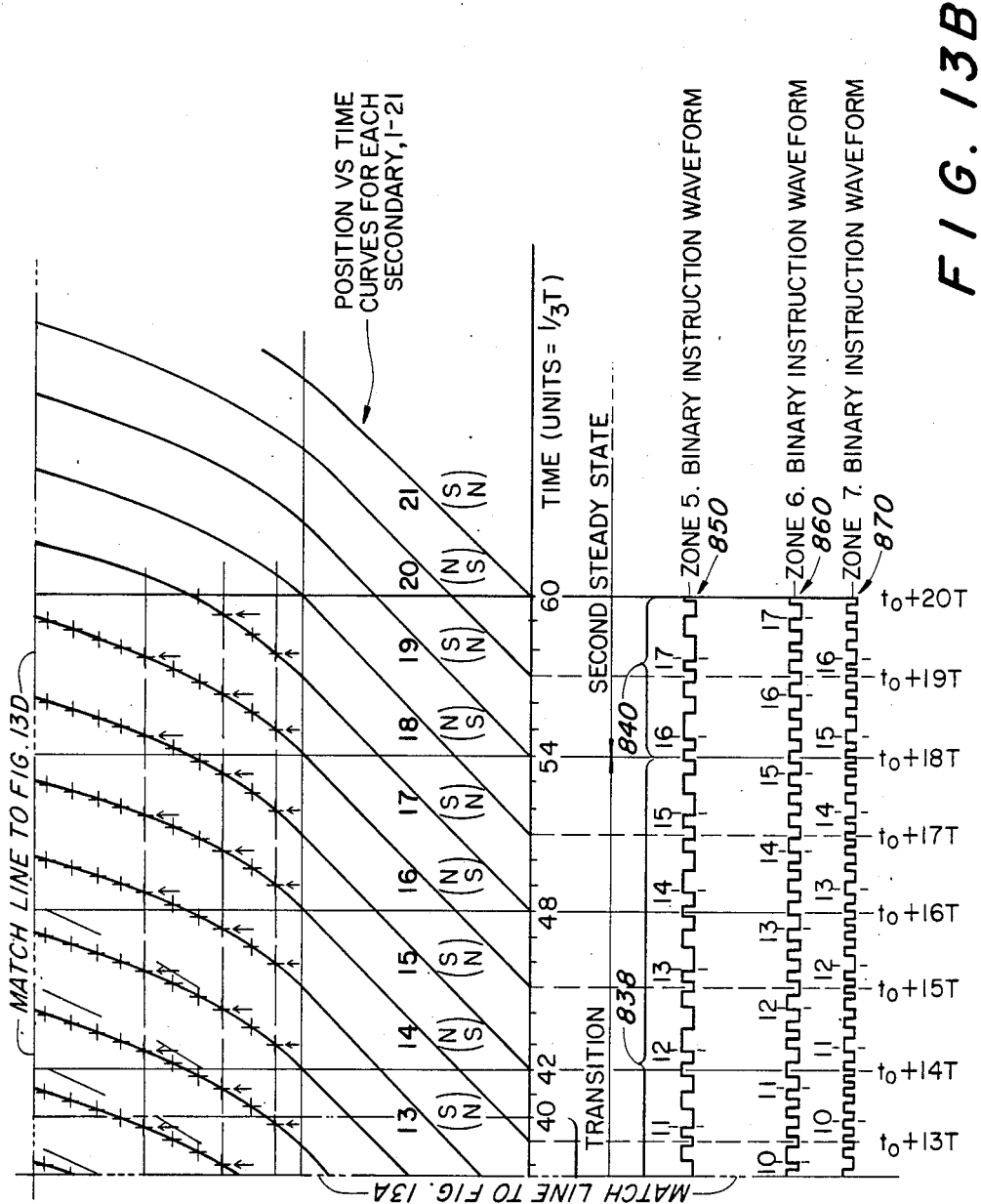
Figure 13C:
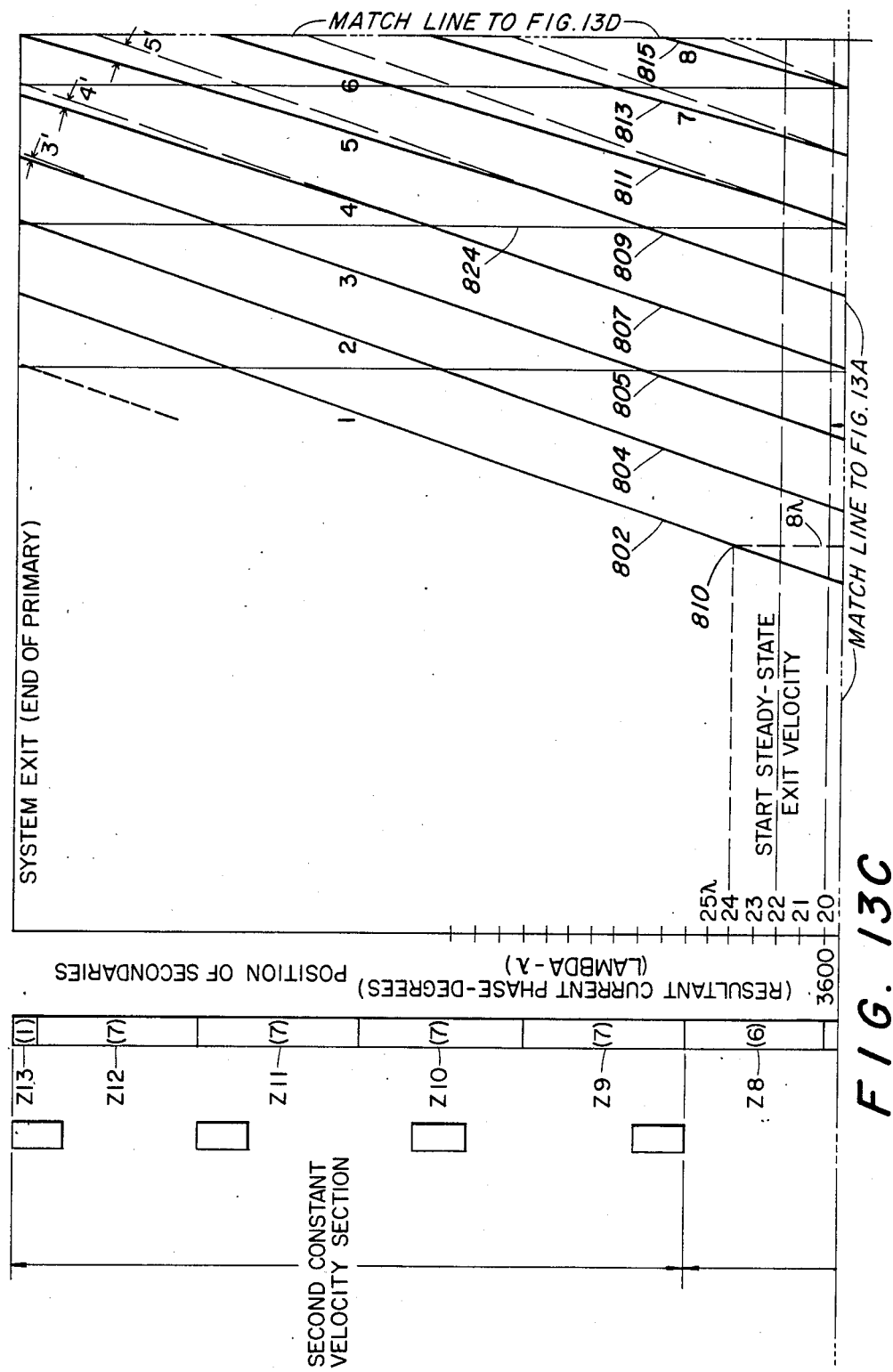

Referring to FIG. 13, a graphical representation of position vs. time for twenty secondaries traveling through the system of the invention is shown. With respect to FIG. 13, steady-state operations, and transition state operations will be described. This graphical representation shown in FIG. 13 is derived by a method described subsequently.

Adjacent to the abscissa of the graph shown in FIG. 13 are representative zones, Zones 1 to 13 with their length in "λ" indicated in parenthesis. The specific zones are labelled with abbreviations such as Z3, representing Zone 3. The abscissa of the graph has marked along it phase angle in degrees with their corresponding λ equivalents. The position along the primary of any secondary which enters the system can be determined by knowing its phase angle. This is true, since the pole pitch of the EM wave is fixed at λ which matches the coil pole pitch of the primary, e.g., A phase to A phase. The EM wave, and any secondary "locked" onto it, will travel the distance of 2λ along the primary for every 360° phase change of the resultant AC current powering the coil windings of the primary that produces the EM wave. The distance a secondary has traveled along the primary can be determined by the following expression:

Secondary position = 2λ (phase)

where, phase is measured in AC cycles or degrees divided by 360°. Therefore, position of the secondary along the primary can be as shown along the abscissa as either phase angle or (N)λ, where N is a positive number.

The value of the binary instructions used for developing the power waveform of that frequency and phase can be determined by translating the phase angle to the curve for that specific secondary and then translating position on the curve to the particular time along the waveform, such as the binary output waveform for $\phi A$ binary instructions 814 disposed below the ordinate of the graph. These high or low values are derived from the truth table shown in FIG. 9.

Waveform 814 is the predetermined A-phase binary instructions for the $\phi A$ power waveform for developing the EM wave for propelling a secondary through the system along curve 802. It is understood that by shifting 60° (or $\frac{1}{3}\lambda$) or 120° (or $\frac{2}{3}\lambda$) from each whole λ unit of the primary, the C phase and B phase binary instruction waveforms can be determined, respectively. In essence, the C and B binary waveforms are similar to A-phase waveform 814 except shifted 60° or 120° to the right, respectively. Also as can be seen, the binary instructions waveform of the A-phase at 814 is constant in first constant frequency, section 816, increasing in varying frequency section 820 and constant again, but at a higher frequency in second constant frequency section 822.

The particular steady state waveforms, such as that for $\phi A$ shown at 814 of FIG. 13, are derived based on the predetermined position of the secondaries along the primary at a given instant of time. Therefore, in order to load the proper instructions in the RAMs of the driver controllers, the following method is used to derive such instructions.

Initially, the spacing for the moving secondaries entering the system is determined. This also determines the repeating time interval, "T", between successive secondaries which move past a fixed reference point in the system. A position vs. time profile is determined for all of the secondaries of the system, when all of the secondaries but follow the same position vs. time profile displaced in increments of time "T". After this, corresponding to the position vs. time profile, a phase angle vs. time determination is made for each secondary in the system at spaced time intervals of "T". Subsequent to this determination, a phase angle vs. time determination for each zone is made by: (1) selecting a starting phase angle corresponding to a selected position of a secondary before such secondary enters a specific zone, which in the present invention is the position where the leading edge of the secondary is at the zone boundary, i.e., the beginning of "handoff"; (2) determining from the phase angle versus time information an interval of information of length "T" beginning with the starting phase angle for the specific zone; and (3) ensuring that the beginning phase angle versus time information for the specific zone matches that of the previous zone at least over the phase angles corresponding to the length of a secondary, meaning that length necessary for a secondary to completely cross the physical zone boundary, but if this is not the case, the position versus time profile or the zone length must be adjusted followed by a repeat of the above steps. In the process above, it is the third step that ensures that there is only one secondary in a zone of the acceleration section at any given instant of time.

Once the phase angles vs. time determination is made for each zone, the zone driver switching signals for each zone are determined. This determination is made by: (1) encoding the phase angle versus time information for each zone into binary switching instructions at discrete points within the time "T" interval of information, where (a) the points must be equally spaced and exactly divide the time interval "T", and (b) the number of points must be the same for all zones, with this number also being equal to the number of memory locations for a given memory type for all of the respective zone controllers; and (2) arranging the switching instructions for each zone into a common time interval designated "$T_c$" by, (a) dividing the total time required for a secondary to reach the selected starting phase, which in the present invention is the beginning of "handoff", by the interval "T" to determine the fractional time beyond the last whole time interval "T", and (b) beginning the common time interval "$T_c$" at the above fracture of time interval "T" and mapping the switching instructions beginning with the starting phase instructions and continuing to the end of the common time interval "$T_c$", and (c) continuing at the beginning of common time interval "$T_c$" mapping the remainder of the instructions, whereby, the remaining instructions when mapped will end at the starting phase instructions.

In operating the system subsequent to carrying out the above actions, zone driver switching instructions from the zone controller memories of a single memory type, RAM X, Y or Z, are simultaneously and continuously paced beginning at a common start time, which in the present invention is preferably at the beginning of common time interval "$T_c$". This will cause each zone to start and repeat its switching instructions for each time interval "T" for each secondary. Now by feeding secondaries into the system at the beginning of each time interval "T", travelling at initial system speed, the secondaries will be in synchronism with the EM wave and be properly "handed-off" from zone to zone throughout the system.

Again referring to FIG. 13, based on the position of a given secondary along the primary, the spacing of that secondary with respect to adjacent secondaries is always known. Taking for example, the first secondary traveling along curve 802, if that secondary has its leading edge at point 806, it is at phase angle 1260°. Tracing down from curve 802 to curve 804 for the second secondary, the line crosses at 808 putting the leading edge of the second secondary at phase angle 720°. This indicates that there is a 3λ spacing between the leading edges. Since each secondary is 2λ long, the spacing between the magnetic edges of these secondaries is 1λ at this point. In like fashion, a first secondary along the curve 802 with its leading edge at 810 is spaced 6λ ahead of the second secondary which will have its leading edge at point 812 along curve 804. This increased spacing means that the successive secondaries are being individually accelerated in the appropriate acceleration zones, independent of the other secondaries.

The method of changing a first steady-state to a transition state and then to a second steady-state will be described referring to FIG. 13. When secondaries 1 through 10 enter the system, all are propelled by the first steady-state, such as that from RAM X of the zone controllers. This will remain true until time, $t_o + 10T$, as will be explained.

The first and second secondaries traveling through the system along curves 802 and 804, respectively, are subjected to only the first steady-state condition of the RAM X. Secondaries 3–11 which travel through the system along curves 805, 807, 809, 811, 813, 815, 817, 819 and 821, respectively, are affected to some degree by the transition state, stored in RAM Y of the zone controllers, when at time $t_o + 10T$ the transition state is selected to change steady-states of operation. Secondaries 12–20 traveling through the system along curves 823, 825, 827, 829, 831, 833, 835, 837, and 839, respectively, will follow the second steady-state curves, such as that stored in RAM Z of the zone controllers but until secondary 11 leaves the system, the second steady-state condition, as per RAM Z, cannot be instituted, as will be described.

When it is desired to transition from the first steady-state to the second steady-state, the transition state, such as that stored in RAM Y, is selected for all zone controllers. As is shown in the graph, the transition state is selected at time, $t_o + 10T$. The transition state operates from time, $t_o + 10T$ to $t_o + 18T$, indicated at 824 and 834, respectively. At time $t_o + 18T$, the last secondary, secondary 11 which is affected by the transition state leaves the system.

When the transition state is selected, it will affect the secondaries along the portion of the primary undergoing change and the secondaries that enter such portion undergoing change during the predetermined time the changes are taking place. So, at time $t_o + 10T$, tracing line 824 upwards from the end of the first constant velocity section plus 2λ at 800, it is readily seen that the secondaries in the system at time $t_o + 10T$ are secondaries 3 to 8. These secondaries are affected by the institution of the transition state at time $t_o + 10T$. During the time the change takes place, the bracketed period at 815, secondaries 9 to 11 are affected.

During the transition state, the waveform powering the primary is non-repeating as it is for steady-state operation. The non-repeating waveforms shown by section 838 of the representative waveforms 850, 860 and 870 for acceleration Zones 5, 6 and 7, respectively, are representations of these waveforms. It is not until the second steady-state, shown at 840 that all zone waveforms, such as waveforms 850, 860 and 870 for Zones 5, 6 and 7, respectively, begin repeating their waveforms indicative of steady-state operations.

Portion 815 of the transition state between lines 824 and 832 and above line 800 is the portion within which the slopes of the curves are changing. In portion 815, the separation of the secondaries that leave the system have time spacings between adjacent secondaries decreasing to a minimum value from the normal time, "T", spacing, with the minimum occurring between secondaries 5 and 6 along curves 809 and 811, respectively. This is indicative of the changing nature of the curves and differences in velocity of the secondaries. After line 832 until line 834, the new steady-state velocities are established but no single curve has the new slope throughout its entire length, which is indicative of the residual affects of the transition state on those curves. This also means that the time at which successive secondaries leave the system has not been stabilized and returned to time, "T" spacing. Until this stabilization is attained, the new steady-state condition is not fully reached at which time the second steady-state waveform of RAM Z can be initiated to power the primary and propel the secondaries. The time separation between secondaries leaving the system steadily increases from the minimum between secondaries 5 and 6 along curves 809 and 811, respectively, to a time spacing of "T" between secondaries 12 and 13 along curves 823 and 825, respectively, which is directly after line 834 when the second steady-state is initiated. Therefore, before the second steady-state can be initiated the system must be flushed of all of the secondaries affected by the transition state.

In operation, RAM select logic for all the zone controllers would operate with the steady-state instructions stored in RAM X until time $t_o + 10T$, at 824. At that time, the RAM select logic will select the transition state by selecting RAM Y. The transition state will be operative from time $t_o10T$ at 824 to time $t_o + 18T$ at 834. That is, the transition state has a preprogrammed time of operation of 8T. This preprogrammed time is the time that it takes for all of the secondaries affected by the transition state to be flushed from the system. At time $t_o + 18T$ the controller will automatically direct the RAM select logic to select RAM Z for operating the system at the new steady-state. Once operating in the second steady-state for RAM Z, the system computer can reprogram RAMs X and Y with new binary instructions. This new programming would provide RAM X with a new steady-state which could be for a higher or lower velocity of the secondaries. The new programming for the RAM Y will be for transitioning from the RAM Z steady-state to the new RAM X steady-state.

The transition instructions for carrying out transitioning from the first steady state to the second state are derived based on a predetermined position versus time of each secondary propelled along the primary by the specific zones during the total transition time. The following is the method for determining the instructions to be loaded into the transition state RAMs of the plurality of zone controllers for carrying out transitioning from the first to the second steady state.

As was true for steady state operations, secondaries enter the system at the predetermined spacing of time interval "T". Initially, a position versus time profile is determined for all of the secondaries in the system at initiation of the transition state. However, the secondaries in, or entering, the system during the transition state do not follow the same position versus time profile. So, to begin with, there is a determination of the position versus time relationship desired for each secondary affected during the transition state with deference to the requirement that only one secondary is in a zone at any given instant of time. For each position versus time profile for the respective secondaries, a phase angle versus time determination is made. Subsequent to this, a phase angle versus time determination for each zone is made by: (1) determining at the initiation time of the transition state the profile of the secondary that is in a specific zone, or if a specific zone is empty, the profile of the last secondary in that zone, and develop the phase angle versus time information from the profile; (2) determining from the phase angle versus time information of the above identified profile, an interval of information beginning at the transition state initiation time, which will be at multiple of time interval "T", and continuing the interval to the starting phase angle of the first secondary entering the zone after initiation of the transition state in the same manner as described above for steady state; (3) determining from the phase angle versus time information of this first secondary's profile, an interval of information beginning at the starting phase angle of this secondary to the time that a second secondary enters the zone; (4) determining from the second secondary's profile the required information as was obtained in step 3 above; (5) continuing the determination process of step 3 above for each successive secondary until each reaches the end of the transition time interval designated "$T_r$", which will occur at a multiple of time interval "T"; (6) ensuring that the beginning phase angle versus time information for each secondary entering a zone during the transition state matches the information for the same secondary in the previous zone at least over the phase angles corresponding to the length of a secondary, meaning that length necessary for a secondary to completely cross the physical zone boundary, but if this is not the case, the position versus time profile or the zone length must be adjusted by repeat of the above steps; (7) encoding the phase angle versus time information for each zone into binary switching instructions at discrete points within the interval "$T_r$" of transition information where, (a) the points must be equally spaced and exactly divide each interval "T" within interval "$T_r$", and (b) the number of points must be the same for all zones, with this number also being equal to the number of memory locations for the transition memory for all zone controllers; and (8) mapping switching instructions for each zone into the common transition time interval "$T_r$" one to one.

To operate the system in the transition state, the system is initially operating in a first steady state and the transition state is selected for all zone controllers at the end of execution of the last instruction in the first steady state RAM. On the next clock pulse, the transition instructions are output simultaneously from all zone controllers starting at the beginning of the common transition time interval "$T_r$". This causes all of the zone controllers to out put transition instructions simultaneously until their respective transition state RAMs reach the end of the transition period in unison. When this end is reached, the second steady state is selected and initiated. The transition instructions are non-repeating and are output only once with the last instruction ending at a predetermined multiple of time interval "T".

For those secondaries affected by the transition state, the original curve for their travel through the system is indicated by the "prime" notation, such as for curve 8, its original curve is marked 8'.

The present invention discloses a system for propelling secondaries along an elongated primary. It is also contemplated that the present invention can have a return side returning the secondaries from the end to the beginning of the elongated primary. In the resulting system, the secondaries are returned to the beginning of the elongated primary by oppositely accelerating the secondaries along the return side. This return side can be a mirror image of the elongated primary for purposes of accelerating the secondaries, or it can be other appropriate means which will supply the secondaries back to the entrance zone of the elongated primary.

The terms and expressions which are employed herein are used as terms of expression and not of limitation. And, there is no intention, in the use of such terms and expressions, of excluding the equivalence of the feature shown, and described, or portions thereof, it being recognized that various modifications are possible in the scope of the invention.

We claim:

1. A system useful for continuously propelling linear synchronous motor secondaries along an elongated linear motor primary having the coils in the motor primary electrically grouped into zones which are disposed along at least a portion of an elongated path, comprising:

a plurality of linear synchronous motor drivers, with each adapted to independently develop a waveform having specific predetermined frequency and phase characteristics to designated zones of the motor primary for developing a traveling electromagnetic wave;

a plurality of dirver controller means, each connected to each motor drive, each of said driver controller means having a memory containing predetermined instructions defining said characteristics of the waveform, and each of said driver controller means independently to provide said instructions to the motor driver connected thereto, said predetermined instructions in each memory means adapted to cause the waveform developed by each driver to propel one synchronous motor secondary at a time completely through said zone, said instructions in the memory means for one zone coordinated in a predetermined manner with the instructions in the memory means for each adjacent zone;

a timing means connected to each of the driver controller means and adapted to cause simultaneous sequencing through the memories of all of the driver controllers to control the providing of isntructions from each of the driver controllers to the motor driver connected thereto such that the coordination of instructions between zones results in the propelling of a secondary synchronously from one zone to the next.

2. The system as recited in claim 1, wherein said primary is separated into at least three sections including a first constant velocity section, an acceleration section within which the secondaries change velocity and a second constant velocity section, with each section having one or more discrete zones contained therein.

3. The system as recited in claim 2, wherein each successive zone of the primary has the same or a longer length than a previous adjacent zone.

4. The system as recited in claim 3, wherein a specific zone has a length of at least λ.

5. The system as recited in claim 2, wherein there are a plurality of secondaries propelled along the primary with only one secondary in any one zone of the acceleration section at any instant of time.

6. The system as recited in claim 5 wherein there is a predetermined time interval between the entry of successive secondaries into the first zone of the primary.

7. The system as recited in claim 1, each zone of the primary being independently powered to develop an electromagnetic wave which propels a secondary between two adjacent zones wherein the frequency and phase of the waveform defined by the instructions in each driver controller means for development of the electromagnetic wave in the primary of one zone matches the frequency and phase of the waveform of the adjacent zone during the period the secondary is propelled between adjacent zones.

8. The system as recited in claim 7, wherein the frequency of the waveform for development of an electromagnetic wave in each zone of the acceleration section of the primary is adapted to vary from a first level to a second level as a secondary is propelled from a beginning to an end of said zone.

9. The system as recited in claim 1, wherein each motor driver includes a driver logic circuit for receiving inputs from the driver controller means connected thereto to provide an output indicative of each specific input and its complement for causing switching in said motor driver.

10. The system as recited in claim 1, wherein the plurality of zones along the primary are contiguous.

11. A system useful for controlling the propelling of linear synchronous motor secondaries along an elongated primary of a linear synchronous motor disposed along at least a portion of an elongated path with at least one secondary having disposed thereon means for attachment to a body or bodies which can be moved with the secondary, comprising:
  a plurality of linear synchronous motor drivers, with each independently providing inputs indicative of a waveform having specific predetermined frequency and phase characteristics to designated coil windings of the primary for developing a traveling electromagnetic wave;
  a plurality of driver controller means, one connected to each motor driver, said driver controller means having a plurality of memory sections with each memory section containing instructions defining characteristics of a waveform, and said driver controller means providing said instructions from one of the plurality of memory sections to the motor driver connected thereto at any instant of time;
  a central controller means connected to all of the driver controller means, the central controller means having a timing means and means to select a memory in each of the driver controller means to control the providing of instructions from each of said driver controller means to the motor driver connected thereto; and
  a computer for providing overall system control, and for providing the plurality of driver controller means with instructions for the specific characteristics of the waveforms for storage in the plurality of memory sections contained therein, and for providing control information to the central controller.

12. The system as recited in claim 11, wherein said central controller means is adapted to control the output of all said driver controller means simultaneously.

13. The system as recited in claims 11 or 12, wherein each of said driver controller means in combination with said central controller means is adapted to provide said instructions arranged in sequence in each memory section to the motor driver to which said driver controller means is connected by sequencing through a selected memory section of the zone controller means.

14. The system as recited in claim 11, wherein each driver controller means has at least three memory sections with a first memory section containing instructions defining the characteristics of frequency and phase of a first waveform, a second memory section containing instructions defining the characteristics of frequency and phase of a second waveform, and a third memory section containing instructions defining the characteristics of frequency and phase of a third waveform, with said third waveform being for transitioning between said first and second waveforms.

15. The system as recited in claim 14, wherein said first and second memory section instructions define the characteristics of separate waveforms that are repeatedly provided, and said third memory section instructions define the characteristics of a waveform that is provided non-repeatedly.

16. The system as recited in claim 11, wherein said primary is separated into at least three sections including a first constant velocity section, an acceleration section within which the secondaries change velocity and a second constant velocity section, with each section having one or more discrete zones contaiend therein.

17. The system as recited in claim 16, each zone of the primary being independently powered to develop an electromagnetic wave which propels a secondary between two adjacent zones, wherein the frequency and phase of the waveform defined by the instructions in each driver controller means for development of the electromagnetic wave in the primary of one zone matches the frequency and phase of the waveform of the adjacent zone during the period the secondary is propelled between adjacent zones.

18. The system as recited in claim 17, wherein the frequency of the waveform for development of an electromagnetic wave in each zone of the acceleration section of the primary is adapted to vary from a first level to a second level as a secondary is propelled from a beginning to an end of said zone.

19. The system as recited in claim 16, wherein each successive discrete zone of the primary has the same or a longer length than a previous adjacent zone.

20. The system as recited in claim 19, wherein a specific zone has a length of at least λ.

21. The system as recited in claim 20, wherein spacing between any adjacent secondaries is at least λ.

22. The system as recited in claim 16, wherein there are a plurality of secondaries propelled along the primary with only one secondary in any one zone of the acceleration section at any instant of time.

23. The system as recited in claim 22, wherein successive secondaries will enter the first zone of the primary at a predetermined time interval.

24. The system as recited in claim 11, wherein each motor driver includes a driver logic circuit for receiving inputs from the driver controller means connected thereto to provide an output indicative of each specific input and its complement for causing switching in said motor driver.

25. The system as recited in claim 11, wherein the plurality of discrete zones along the primary are contiguous.

26. A method of controlling the velocity and spacing of secondaries traveling along a primary of a linear synchronous motor having coils grouped into zones, comprising the steps of:
independently generating a predetermined waveform in each of a plurality of zones in the primary within which the velocity of the secondaries is controlled with separate zone driver means by controlling the frequency and phase of the waveform to propel the plurality of secondaries through each of said zones with the waveform so that only one secondary is in any one zone at any instant of time; and
coordinating in time the frequency and phase of the waveform in each zone with the waveforms of adjacent zones so that the waveform for each zone matches the waveform of adjacent zone as a secondary crosses between adjacent zones.

27. The method of claim 26, in which the velocity and spacing of secondaries are changed from a first operating condition according to a first varying velocity profile to a second operating condition according to a second varying velocity profile, and further includes the steps of:
(a) independently generating a predetermined waveform for each of said zones according to said first varying velocity profile repeatedly;
(b) terminating step (a); and
(c) simultaneously independently generating a predetermined waveform in each of said zones according to a transition varying velocity profile for a predetermined time period nonrepeatedly;
(d) terminating step (c) at the end of the predetermiend time period; and
(e) simultaneously independently generating the predetermined waveform for each of said zones according to said second varying velocity profile repeatedly.

28. The method as recited in claim 26 or 27, wherein independently generating a waveform includes varying the frequency and phaes of the waveform as the secondary is propelled through a zone and as the waveform for each zone matches the waveform of adjacent zones as a secondary is propelled between adjacent zones.

29. A method of arranging instructions indicative of the frequency and phase of a waveform for developing an electromagnetic wave in the primary of a linear synchronous motor in a memory of a zone controller means of a zone driver means of said linear synchronous motor, with said linear synchronous motor having an elongated primary divided into zones with the coil windings of each zone being independently driven by a zone drive means, said zone drive means having a motor driver connected to the coil windings of a zone and a zone controller means connected to the motor driver for providing instructions to said motor driver for development of a waveform in the motor driver with said waveform being used to develop the electromagnetic wave in the zone of the primary to which said motor driver is connected, with the traveling electromagnetic wave developed in the zones of the primary synchronously propelling multiple secondaries along the primary, with each of said secondaries entering the first zone of the primary at a predetermined spacing and each of said secondaries following a predetermined position versus time profile which determines a corresponding phase angle versus time for the characteristics of the waveform for that zone, comprising the steps of:
(a) selecting a common start time for all zones at a whole multiple of a predetermined time interval "T", whereby said predeterimined time interval "T" is the time period between secondaries entering the first zone of the primary;
(b) selecting a common instruction time interval "$T_c$" equal to a whole multiple of time interval "T" whereby "$T_c$" is equal to or greater than said time interval "T";
(c) determining a starting phase angle for each zone corresponding to a predetermined position of a secondary before said secondary enters that specific zone;
(d) determining at the selected start time a position versus time profile for a secondary in a specific zone or where said specific zone has no secondary contained therein determining the position versus time profile for a last secondary in said specific zone;
(e) determining from phase angle versus time information corresponding to the position versus time profile determined in step (d), an interval of said information beginning at the common start time selected in step (a) and continuing said determination of said phase angle versus time information to a starting phase angle of a next secondary to enter the specific zone;
(f) determining from phase angle versus time information of the next secondary to enter the specific zone an interval of information beginning at a starting phase angle of said next secondary and continuing said determination of phase angle versus time information for said next secondary to the starting phase angle of a secondary following said next secondary to enter the specific zone;
(g) repeating step (f) for each successive secondary for the common time interval "$T_c$" to determine for each zone its phase angle versus time information, and ensuring that phase angle versus time information for a specific zone during the common time interval "$T_c$" matches the phase angle versus time information in a previous zone at least over the phase angles corresponding to a secondary completely crossing a boundary of the specific zone being entering for determining whether the specific zone has a length which ensures only one secondary is in said specific zone at any instant of time;
(h) encoding phase angle versus time information for each discrete zone into binary instructions;
(i) mapping the binary instructions for each zone into a common zone time interval "$T_z$" with said common zone time interval "$T_z$" being equal to common instruction time interval "$T_c$" on a one for one basis.

30. A system useful for independently controlling the propelling of a plurality of synchronous linear motor secondaries continuously along an elongated linear synchronous motor priamry having the coils in the primary electrically grouped into zones, and with each of said plurality of linear synchronous motor secondaries entering said primary spaced apart and following a predetermined positon versus time profile, comprising:
- a plurality of of linear synchronous motor drivers, with each motor driver adapted to independently develop a predetermiend waveform having specific frequency and phase characteristics according to the position versus time profile for each secondary, each motor driver adapted to indepednently provide said waveform to a designated zone of the primary to which a specific motor driver is connected for developing a traveling electromagnetic wave;
- a plurality of drive controller means with one of the plurality of driver controller means being connected to each of said motor drivers, each driver controller means having a memory means containing information defining phase versus time characteristics of said waveform, with the memory means containing information to propel one secondary at a time completely through said designated zone and said information having a specific reference location common to the memory means of all zone controllers and a start location to begin propelling a secondary through said designated zone and with each said driver controller means having an access means to sequentially access said information in said memory means beginning at said reference location, and said start location is arranged in a predetermined manner in relation to said reference location; and
- a timing means connected to each driver controller means for simultaneously causing said access means of each driver controller means to access all of the information in its memory means in a predetermined time interval.

31. A method of propelling a plurality of linear synchronous motor secondaries along an elongated linear motor primary having coils grouped into a plurality of zones, with each of the secondaries following a predetermined velocity versus position profile, comprising the steps of:
- powering with a first waveform a first zone of the elongated primary said first waveform corresponding to a first specific section of the velocity versus position profile, said first waveform having a predetermined starting phase with the frequency of said first waveform changing from a first value to a second value propel one secondary at a time through the first zone and across zone boundaries at respective ends of said first zone;
- powering with a second waveform a second adjacent zone of the elongated primary, said second waveform corresponding to a second specific section of the velocity versus position profile, said second waveform having a predetermined starting phase with the frequency of said second waveform changing from a third value to a fourth value to propel one secondary at a time through the second zone and across zone boundaries at the respective ends of the second zone; and
- powering said first and second zones simultaneously so that as a secondary reaches the zone boundary of the second zone after travelling through the first zone and until said secondary is completely in said second zone, the waveforms of the first and second zones are matched in frequency and phase from said third frequency value to said second frequency value.

* * * * *